(12) United States Patent
Baik

(10) Patent No.: US 7,688,294 B2
(45) Date of Patent: Mar. 30, 2010

(54) METHOD AND APPARATUS FOR DRIVING LIQUID CRYSTAL DISPLAY

(75) Inventor: Seong Ho Baik, Gwachun-shi (KR)

(73) Assignee: LG Display Co., Ltd., Seoul (KR)

( * ) Notice: Subject to any disclaimer, the term of this patent is extended or adjusted under 35 U.S.C. 154(b) by 1236 days.

(21) Appl. No.: 10/880,392

(22) Filed: Jun. 28, 2004

(65) Prior Publication Data

US 2005/0104842 A1    May 19, 2005

(30) Foreign Application Priority Data

Nov. 17, 2003   (KR) .................. 10-2003-0081171

(51) Int. Cl.
*G09G 3/36*    (2006.01)

(52) U.S. Cl. .................. 345/88; 345/690; 348/672; 348/678

(58) Field of Classification Search .......... 345/88–89, 345/690; 348/671–672, 678
See application file for complete search history.

(56) References Cited

U.S. PATENT DOCUMENTS

| | | | |
|---|---|---|---|
| 5,717,422 A | | 2/1998 | Fergason |
| 6,373,533 B1 | | 4/2002 | Kawabata et al. |
| 6,463,173 B1 | * | 10/2002 | Tretter .................. 382/168 |
| 7,129,975 B2 | * | 10/2006 | Levine et al. ............ 348/246 |
| 2001/0033260 A1 | | 10/2001 | Nishitani et al. |
| 2002/0011979 A1 | | 1/2002 | Nitta et al. |
| 2002/0057238 A1 | | 5/2002 | Nitta et al. |
| 2002/0130830 A1 | | 9/2002 | Park |
| 2003/0002736 A1 | | 1/2003 | Maruoka et al. |
| 2003/0020974 A1 | | 1/2003 | Matsushima |
| 2003/0151565 A1 | | 8/2003 | Kim et al. |
| 2004/0258324 A1 | * | 12/2004 | Liang et al. .............. 382/274 |

FOREIGN PATENT DOCUMENTS

| | | |
|---|---|---|
| EP | 1 111 578 | 6/2001 |
| JP | 2002055664 | 2/2002 |
| KR | 2002-32018 | 5/2002 |
| KR | 2002-73353 | 9/2002 |

OTHER PUBLICATIONS

Office Action dated Mar. 28, 2007 for corresponding German Patent Application 10 2004 031 438.1-32.
Hwang et al., "29.4L: Late-News Paper: Image Synchronized Brightness Control", *SID Digest*, vol. XXXII, pp. 492-493, 2001.
Search Report for corresponding French Patent Application Serial No. 0407233 dated Jul. 25, 2007.

* cited by examiner

*Primary Examiner*—Amr Awad
*Assistant Examiner*—Michael Pervan
(74) *Attorney, Agent, or Firm*—Brinks Hofer Gilson & Lione

(57) ABSTRACT

A method of driving a liquid crystal display is provided in which the contrast can be selectively emphasized dependent upon the input data. The input data is converted into brightness components and chrominance components. The most-frequent brightness component is extracted from a histogram of the brightness components, and the histogram is divided into regions, which are re-arranged in correspondence with the extracted most-frequent value. The brightness components of each region are then modified using a curve having a slope that is dependent upon the total number of brightness components in the particular region. Data in which the contrast ratio has been selectively emphasized is generated using the modulated brightness components and the chrominance components.

48 Claims, 20 Drawing Sheets

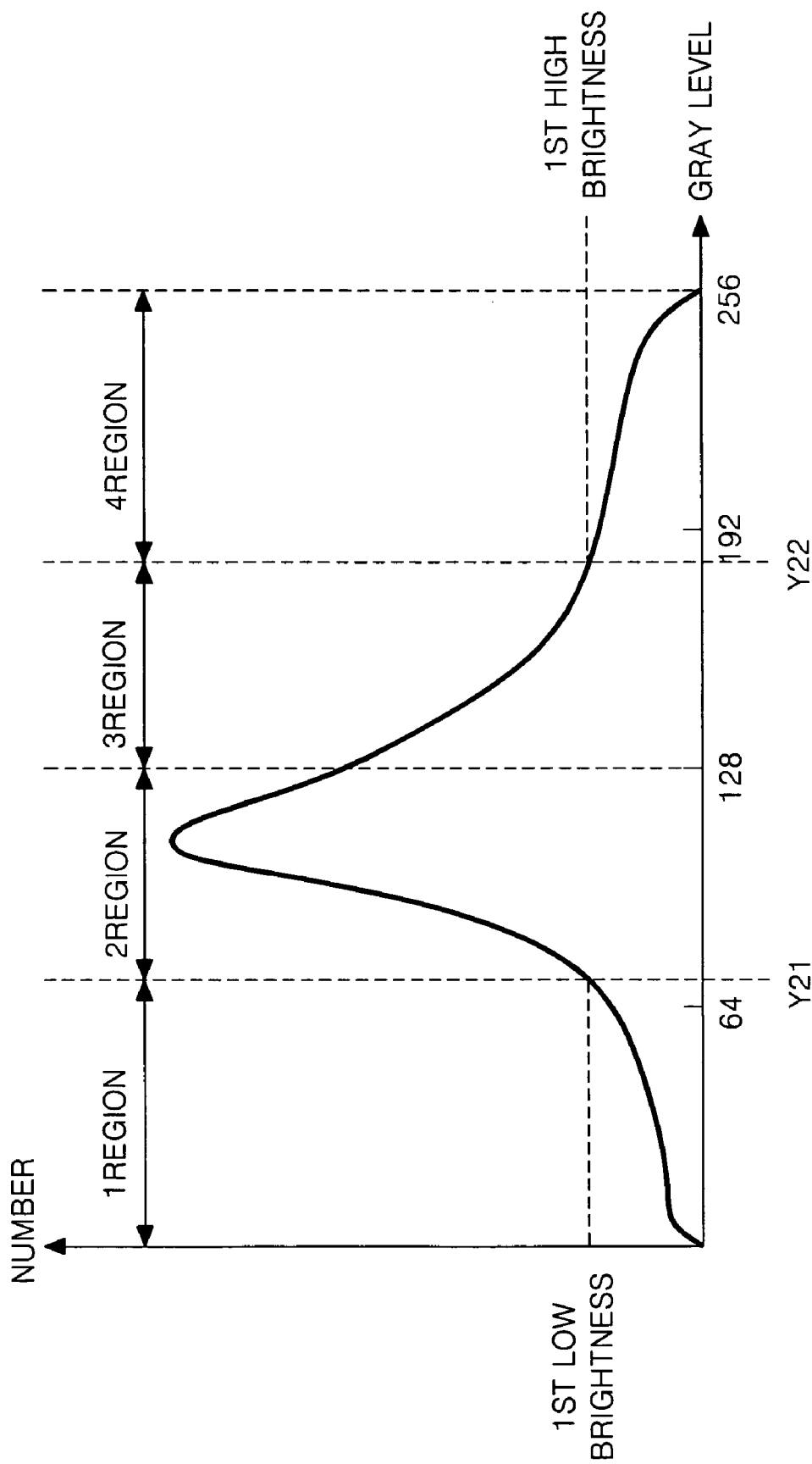

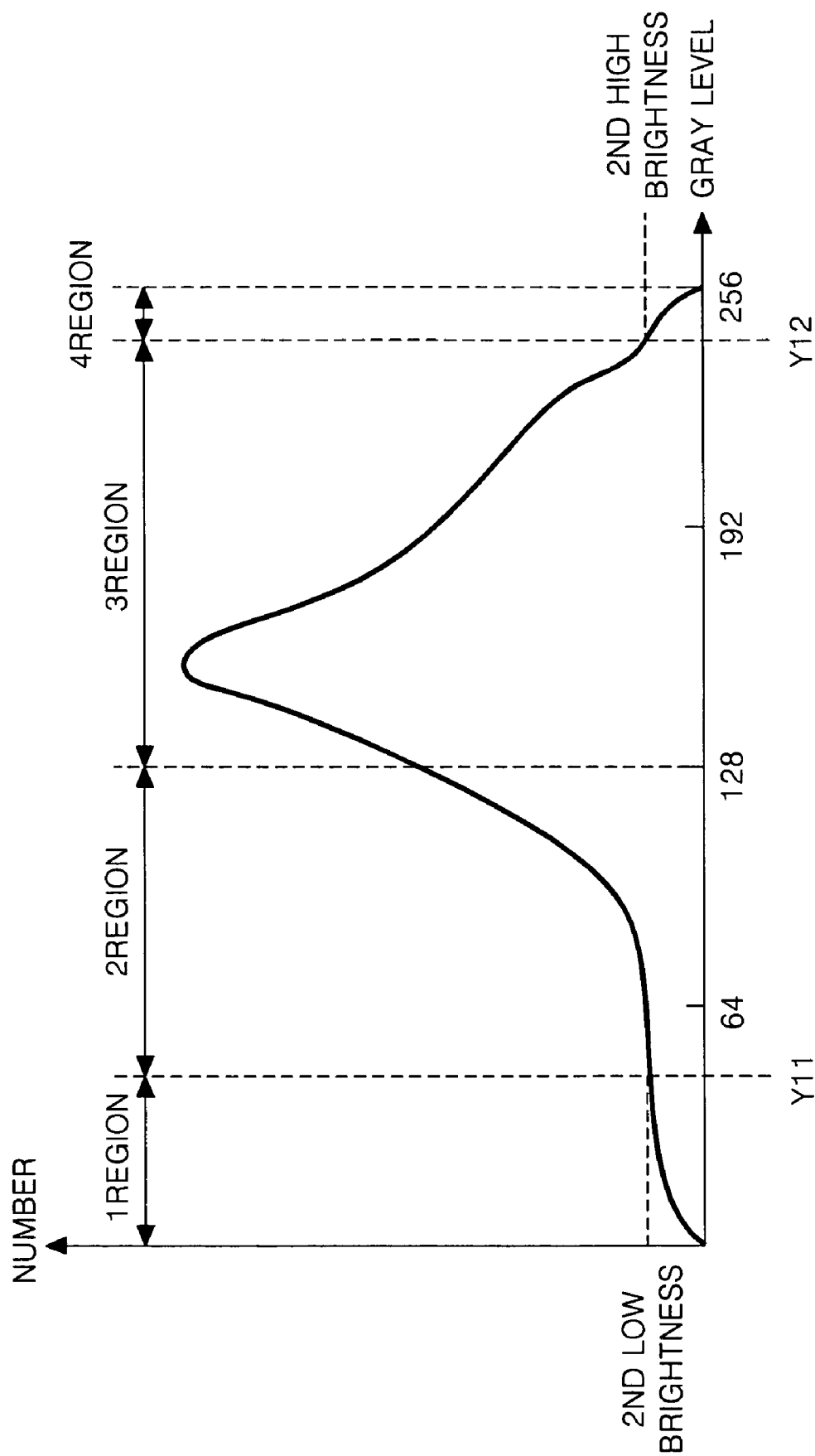

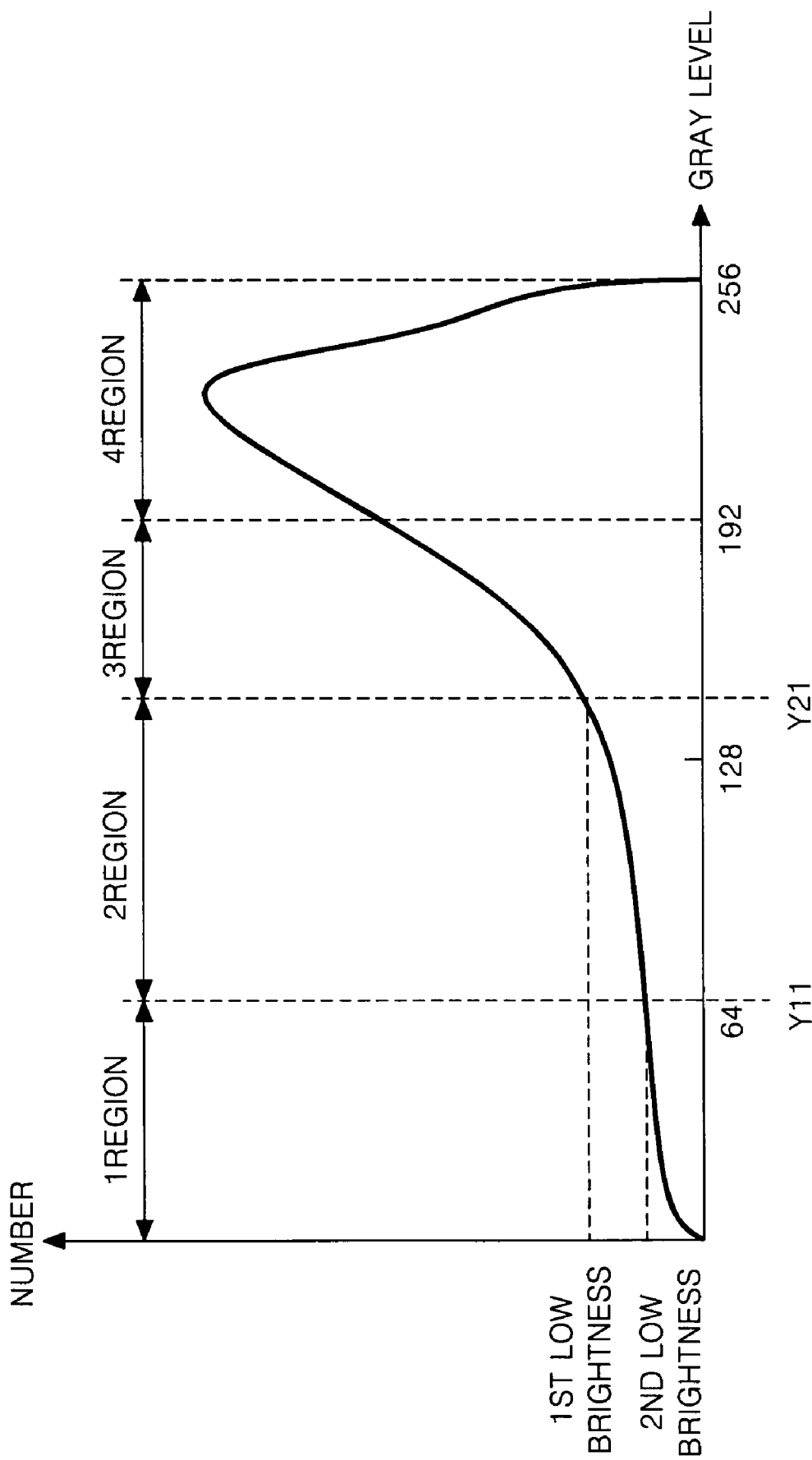

SLOPE2 > SLOPE3 > SLOPE1 == SLOPE4

SLOPE2 > SLOPE3 > SLOPE1 == SLOPE4

SLOPE3 > SLOPE2 > SLOPE1 == SLOPE4

SLOPE3 > SLOPE2 > SLOPE1 == SLOPE4

SLOPE4 > SLOPE3 > SLOPE1 == SLOPE2

METHOD AND APPARATUS FOR DRIVING LIQUID CRYSTAL DISPLAY

This application claims the benefit of the Korean Patent Application No. P2003-81171 filed in Korea on Nov. 17, 2003, which is hereby incorporated by reference.

BACKGROUND OF THE INVENTION

1. Field of the Invention

This invention relates to a liquid crystal display, and more particularly to a driving method and apparatus for a liquid crystal display wherein a contrast can be selectively emphasized in correspondence with input data.

2. Description of the Related Art

Generally, a liquid crystal display (LCD) controls light transmittance of liquid crystal cells in accordance with video signals to thereby display a picture. Such an LCD has been implemented by an active matrix type having a switching device for each cell, and applied to a display device such as a monitor for a computer, office equipments, a cellular phone and the like. The switching device for the active matrix LCD mainly employs a thin film transistor (TFT).

FIG. 1 schematically shows a conventional LCD driving apparatus.

Referring to FIG. 1, the conventional LCD driving apparatus includes a liquid crystal display panel 2 having m×n liquid crystal cells Clc arranged in a matrix type, m data lines D1 to Dm and n gate lines G1 to Gn intersecting each other and thin film transistors TFT provided at the intersections, a data driver 4 for applying data signals to the data lines D1 to Dm of the liquid crystal display panel 2, a gate driver 6 for applying scanning signals to the gate lines G1 to Gn, a gamma voltage supplier 8 for supplying the data driver 4 with gamma voltages, a timing controller 10 for controlling the data driver 4 and the gate driver 6 using synchronizing signals from a system 20, a direct current to direct current converter 14, hereinafter referred to as "DC/DC converter", for generating voltages supplied to the liquid crystal display panel 2 using a voltage from a power supply 12, and an inverter 16 for driving a back light 18.

The system 20 applies vertical/horizontal signals Vsync and, Hsync, clock signals DCLK, a data enable signal DE and data R, G and B to the timing controller 10.

The liquid crystal display panel 2 includes a plurality of liquid crystal cells Clc arranged, in a matrix type, at the intersections between the data lines D1 to Dm and the gate lines G1 to Gn. The thin film transistor TFT provided at each liquid crystal cell Clc applies a data signal from each data line D1 to Dm to the liquid crystal cell Clc in response to a scanning signal from the gate line G. Further, each liquid crystal cell Clc is provided with a storage capacitor Cst. The storage capacitor Cst is provided between a pixel electrode of the liquid crystal cell Clc and a pre-stage gate line or between the pixel electrode of the liquid crystal cell Clc and a common electrode line, to thereby constantly keep a voltage of the liquid crystal cell Clc.

The gamma voltage supplier 8 applies a plurality of gamma voltages to the data driver 4.

The data driver 4 converts digital video data R, G and B into analog gamma voltages (i.e., data signals) corresponding to gray levels in response to a control signal CS from the timing controller 10, and applies the analog gamma voltages to the data lines D1 to Dm.

The gate driver 6 sequentially applies a scanning pulse to the gate lines G1 to Gn in response to a control signal CS from the timing controller 10 to thereby select horizontal lines of the liquid crystal display panel 2 supplied with the data signals.

The timing controller 10 generates the control signals CS for controlling the gate driver 6 and the data driver 4 using the vertical/horizontal synchronizing signals Vsync and Hsync and the clock signal DCLK inputted from the system 20. Herein, the control signal CS for controlling the gate driver 6 is comprised of a gate start pulse GSP, a gate shift clock GSC and a gate output enable signal GOE, etc. Further, the control signal CS for controlling the data driver 4 is comprised of a source start pulse SSP, a source shift clock SSC, a source output enable signal SOE and a polarity signal POL, etc. The timing controller 10 re-aligns the data R, G and B from the system 20 to apply them to the data driver 4.

The DC/DC converter 14 boosts or drops a voltage of 3.3V inputted, from the power supply 12 to generate a voltage supplied to the liquid crystal display panel 2. Such a DC/DC converter 14 generates a gamma reference voltage, a gate high voltage VGH, a gate low voltage VGL and a common voltage Vcom.

The inverter 16 applies a driving voltage (or driving current) for driving the back light 18 to the back light 18. The back light 18 generates light corresponding to the driving voltage (or driving current) from the inverter 16 to apply it to the liquid crystal display panel 2.

In order to display a vivid image in the liquid crystal display panel 2 driven in this manner, a distinct contrast between brightness and darkness in a portion that has many gray levels is made. However, since a method of selectively enlarging the contrast ratio of data in correspondence with the data does not exist in the conventional LCD, it is difficult to display a dynamic and fresh image. Moreover, in the conventional LCD, the back light 18 emits light at a constant brightness, independent of the data. If the back light 18 radiates light at a constant brightness independent of the data, then it is difficult to display a dynamic and fresh image on the liquid crystal display panel 2.

SUMMARY OF THE INVENTION

Accordingly, a driving method and apparatus for a liquid crystal display are provided in which the contrast can be selectively emphasized in correspondence with input data.

A method of driving a liquid crystal display according to one aspect of the present invention includes (A) converting first data into brightness components and chrominance components; (B) modulating the brightness components such that a contrast ratio is selectively emphasized to thereby generate modulated brightness components; and (C), generating second data having a selectively emphasized contrast ratio using the modulated brightness components and the chrominance components.

The method further includes converting a synchronizing signal inputted from the exterior in synchronization with the first data to be synchronized with the second data.

The above (B) comprises arranging the brightness components into gray levels for each frame to generate a histogram; extracting a control value from the histogram; dividing the histogram into a plurality of fixed regions to determine a region to which the control value belongs; re-setting the regions of the histogram in correspondence with the region to which the control value belongs; and generating the modulated brightness components using a curve with different slopes in the re-set histogram regions.

The method further includes controlling brightness of a back light to be in proportion to a gray level of the control value.

The chrominance components are delayed until the modulated brightness components are generated.

The control value is selected to be a gray level existing most frequently in the histogram.

Determining the region to which the control value belongs includes dividing the histogram into a first region, a second region, a third region and a fourth region such that each histogram can be divided into the same region and determining a region to which the control value belongs of the divided four regions.

Re-setting, regions of the histogram re using two extracted brightnesses, and extracting the extracted brightnesses in response to the control value comprises two of: extracting a first low, brightness as a first gray level of the histogram having a frequency that exceeds a first reference value; extracting a first high brightness as a last gray level of the histogram having a frequency that exceeds the first reference; extracting a second low brightness as a first gray level of the histogram having a frequency that exceeds a second reference; and extracting a second high brightness as a last gray level of the histogram having a frequency that exceeds the second reference.

The first reference is a frequency that is 5% to 10% of a maximum frequency in the histogram.

The second reference is a frequency that is 1% to 4.9% of the maximum frequency in the histogram.

The gray levels increase from the first region to the fourth region.

When the control value is in the first region, the first and second high brightness are extracted and the regions of the histogram are re-arranged using the extracted first and second high brightness.

When the control value is in the second region or the third region, the second low brightness and the second high brightness or the first low brightness and the first high brightness are extracted and the regions of the histogram are re-arranged using the extracted second low brightness and the extracted second high brightness or the extracted first low brightness and the extracted first high brightness.

When the control value is in the fourth region, the first and second low brightness are extracted and the regions of the histogram are re-arranged using the extracted first and second low brightness.

After the regions of the histogram are re-arranged, the modulated brightness components are generated with using a curve having slopes proportional to the amounts of data in the regions.

The modulated brightness components are generated with using a curve having a largest slope in a region to which the control value belongs.

The method further includes determining positions of the first low brightness and the first high brightness; and generating the second data from non-modulated brightness components and chrominance components when the first low brightness and the first high brightness are in the same region and have a desired gray level therebetween.

The method further includes determining positions of the second low brightness and the second high brightness; and generating the second data from non-modulated brightness components and chrominance components when the second low brightness and the second high brightness are in the same region and have a desired gray level therebetween.

A driving apparatus for a liquid crystal display according to another aspect of the present invention includes a brightness/color separator for converting first data into brightness components and chrominance components; a modulator for modulating the brightness components such that a contrast ratio thereof is selectively emphasized to thereby generate modulated brightness components; and a brightness/color mixer for generating second data having a selectively emphasized contrast ratio using the modulated brightness components and the chrominance components.

The driving apparatus further includes a controller for converting a synchronizing signal in synchronization with the first data to be synchronized with the second data.

The modulator includes a brightness analyzer for arranging the brightness components into gray levels for each frame to generate a histogram and for extracting a control value from the histogram; a moving region selector for dividing the histogram into a plurality of moving regions in response to the control value; and a data controller for generating the modulated brightness components using a curve of different slopes in the plurality of moving regions.

The driving apparatus further includes an inverter controller for controlling brightness of a back light in correspondence with a gray level of the control value.

The driving apparatus further includes delay means for delaying the chrominance components until the modulated brightness components are generated.

The brightness analyzer includes a histogram calculator for arranging the brightness components into gray levels for each frame to generate a histogram; a control value extractor for extracting the control value from the histogram; and a brightness selector for dividing the histogram into a plurality of fixed regions and determining a fixed region to which the control value belongs.

The brightness selector divides the histogram into a first region, a second region, a third region and a fourth region such that each histogram can be divided into the same fixed region, and determines the region to which the control value belongs of the divided four regions.

The brightness analyzer includes a first low brightness extractor for extracting a first low brightness as a first gray level of the histogram having a frequency that exceeds a first reference; a first high brightness extractor for extracting a first high brightness as a last gray level of the histogram having a frequency that exceeds the first reference; a second low brightness extractor for extracting a second low brightness as a first gray level of the histogram having a frequency that exceeds a second reference; and a second high brightness extractor for extracting a second high brightness as a last gray level of the histogram having a frequency that exceeds the second reference. The brightness selector applies at least two brightnesses, of the first low brightness, the first high brightness, the second low brightness and the second high brightness, in correspondence with an area to which the control value belongs to the moving region selector.

Herein, the first reference is a frequency that is 5% to 10% of a maximum frequency in the histogram.

The second reference is a frequency that is 1% to 4.9% of a maximum frequency in the histogram.

The gray levels increase from the first region to the fourth region.

When the control value is in the first region, the brightness selector extracts the first and second high brightness, and the moving region selector sets moving regions of the histogram using the extracted first and second high brightness.

When the control value is in the second region or the third region, the brightness selector extracts the second low brightness and the second high brightness or the first low brightness and the first high brightness, and the moving region selector sets moving regions of the histogram using the extracted second low brightness and the extracted second high brightness or the extracted first low brightness and the extracted first high brightness.

When the control value is in the fourth region, the brightness selector extracts the first and second low brightness, and the moving region selector re-arranges the regions of the histogram using the extracted first and second low brightness.

After the regions of the histogram are re-arranged, the data processor generates the modulated brightness components using a curve having slopes proportional to the amounts of data in the regions.

The modulated brightness components are generated with using a curve having a largest slope in a region to which the control value belongs.

The brightness selector applies a control signal to the data processor when the first low brightness and the first high brightness, are in the same region and have a desired gray level therebetween, and the data processor generates the second data from non-modulated brightness components and chrominance components.

Alternatively, the brightness selector applies a control signal to the data processor when the second low brightness and the second high brightness are in the same region and have a desired gray level therebetween, and the data processor generates the second data from non-modulated brightness components and chrominance components.

BRIEF DESCRIPTION OF THE DRAWINGS

The invention will be apparent from the following detailed description of the embodiments of the present invention with reference to the accompanying drawings, in which:

FIG. 8A and FIG. 8B are graphs showing divided regions of a histogram in which the most-frequent value is in the second region;

FIG. 9A and FIG. 9B are graphs showing divided regions of a histogram in which the most-frequent value is in the third region;

FIG. 10 is a graph showing divided regions of a histogram in which the most-frequent value is in the fourth region;

DETAILED DESCRIPTION OF THE PREFERRED EMBODIMENT

Figure 1:
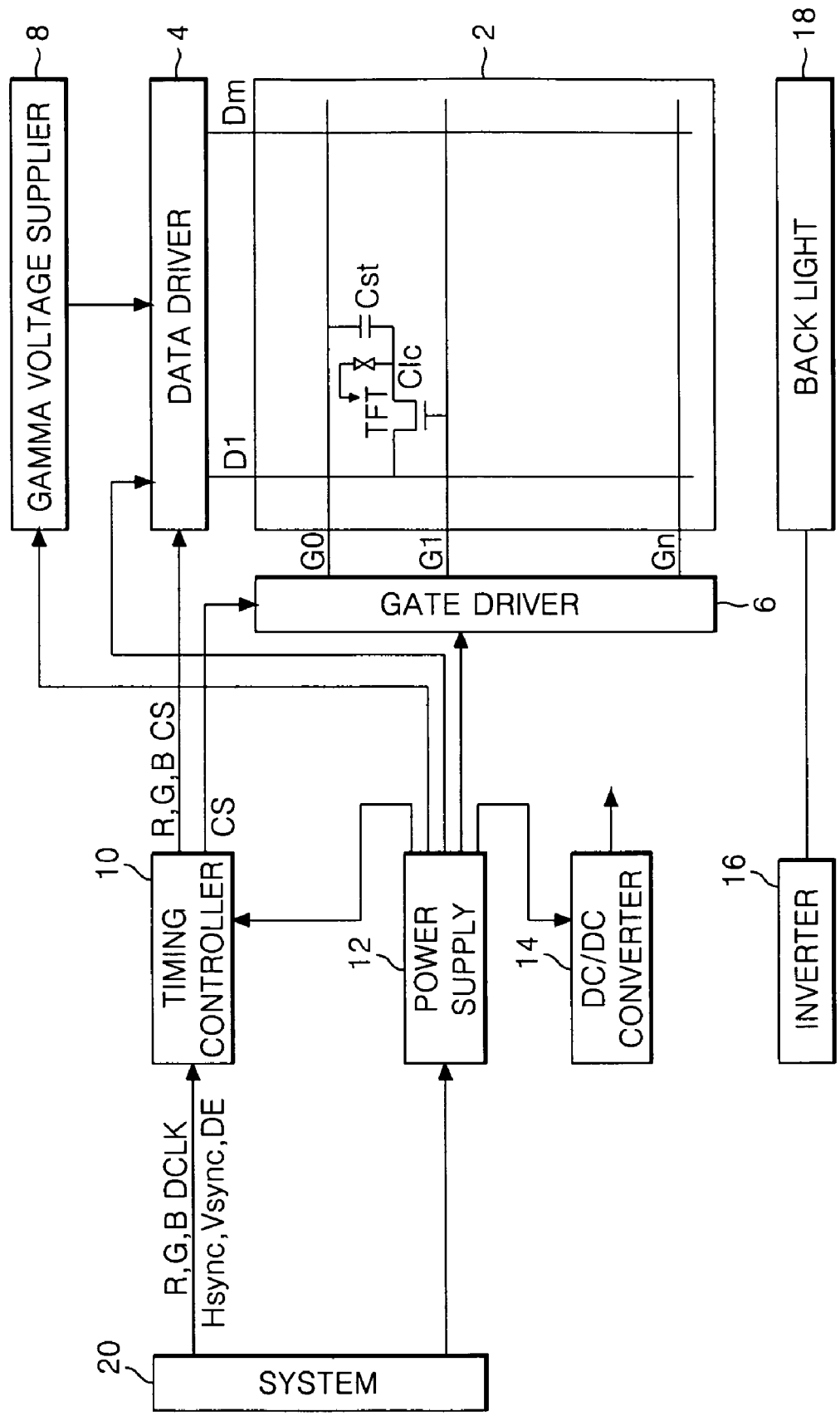
FIG. 1 is a schematic block diagram showing a configuration of a conventional driving apparatus for a liquid crystal display.
Figure 2:
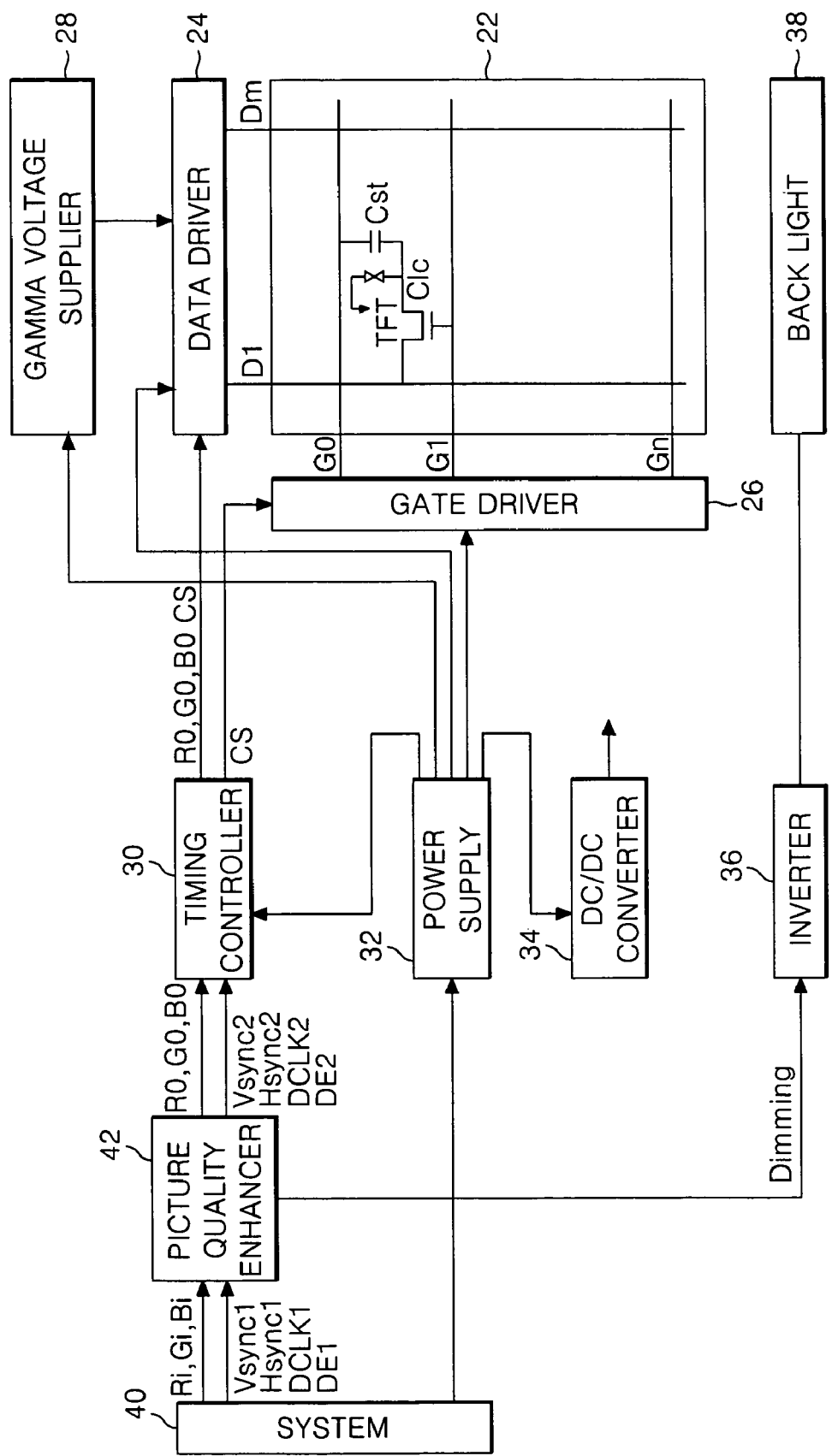
FIG. 2 is a schematic block diagram showing a configuration of a driving apparatus for a liquid crystal display according to an embodiment of the present invention.

FIG. 2 schematically shows a driving apparatus for a liquid crystal display (LCD) according to an embodiment of the present invention.

Referring to FIG. 2, the LCD driving apparatus according to the embodiment of the present invention includes a liquid crystal display panel 22 having m×n liquid crystal cells Clc arranged in a matrix, m data lines D1 to Dm and n gate lines G1 to Gn intersecting each other and thin film transistors TFT provided at the intersections, a data driver 24 for applying data signals to the data lines D1 to Dm of the liquid crystal display panel 22, a gate driver 26 for applying scanning signals to the gate lines G1 to Gn, a gamma voltage supplier 28 for supplying the data driver 24 with gamma voltages, a timing controller 30 for controlling the data driver 24 and the gate driver 26 using a second synchronizing signal from a picture quality enhancer 42, a DC/DC converter 34 for generating voltages supplied to the liquid crystal display panel 22 using a voltage from a power supply 32, an inverter 36 for driving a back light 38, and a picture quality enhancer 42 for selectively emphasizing a contrast of input data and for applying a brightness control signal Dimming corresponding to the input data to the inverter 36.

The system 40 applies first vertical/horizontal signals Vsync1 and Hsync1, a first clock signal DCLK1, a first data enable signal DE1 and first data Ri, Gi and Bi to the picture quality enhancer 42.

The liquid crystal display panel 22 includes a plurality of liquid crystal cells. Clc arranged, in a matrix, at the intersections between the data lines D1 to Dm and the gate lines G1 to Gn. The thin film transistor TFT provided at each liquid crystal cell Clc applies a data signal from each data line D1 to Dm to the liquid crystal cell Clc in response to a scanning signal from the gate line G. Further, each liquid crystal cell Clc is provided with a storage capacitor Cst. The storage capacitor Cst is provided between a pixel electrode of the liquid crystal cell Clc and a pre-stage gate line or between the pixel electrode of the liquid crystal cell Clc and a common electrode line, to thereby constantly keep a voltage of the liquid crystal cell Clc.

The gamma voltage supplier 28 applies a plurality of gamma voltages to the data driver 24.

The data driver 24 converts digital video data R, G and B into analog gamma voltages (i.e., data signals) corresponding to gray levels in response to a control signal CS from the timing controller 30, and applies the analog gamma voltages to the data lines D1 to Dm.

The gate driver 26 sequentially applies a scanning pulse to the gate lines G1 to Gn in response to a control signal CS from the timing controller 30 to thereby select horizontal lines of the liquid crystal display panel 22 supplied with the data signals.

The timing controller 30 generates the control signals CS for controlling the gate driver 26 and the data driver 24 using second vertical/horizontal synchronizing signals Vsync2 and Hsync2 and a second clock signal DCLK2 inputted from the picture quality enhancer 42. The control signal CS for controlling the gate driver 26 is comprised of a gate start pulse GSP, a gate shift clock GSC and a gate output enable signal GOE, etc. Further, the control signal CS for controlling the data driver 24 is comprised of a source start pulse SSP, a source shift clock SSC, a source output enable signal SOE and a polarity signal POL, etc. The timing controller 30 re-aligns second data Ro, Go and Bo from the picture quality enhancer 42 to apply them to the data driver 24.

The DC/DC converter 34 boosts or drops a voltage of 3.3V inputted from the power supply 32 to generate a voltage supplied to the liquid crystal display panel 22. Such a DC/DC converter 14 generates a gamma reference voltage, a gate high voltage VGH, a gate low voltage VGL and a common voltage VCOM.

The inverter 36 applies a driving voltage (or driving current) corresponding to the brightness control signal Dimming from the picture quality enhancer 42 to the back light 38. In other words, a driving voltage (or driving current) applied from the inverter 36 to the back light 38 is determined by the brightness control signal Dimming from the picture quality enhancer 42. The back light 38 applies a light corresponding to the driving voltage (or driving current) from the inverter 36 to the liquid crystal display panel 22.

The picture quality enhancer 42 extracts brightness components using the first data Ri, Gi and Bi from the system 40, and generates second data Ro, Go and Bo obtained by a change in gray levels of the first data Ri, Gi and Bi in correspondence with the extracted brightness components. The picture quality enhancer 42 generates a brightness control signal Dimming corresponding to the brightness components to apply it to the inverter 36. Moreover, the picture quality enhancer 42 generates second vertical/horizontal synchronizing signals Vsync2 and Hsync2, a second clock signal DCLK2 and a second data enable signal DE2 synchronized with the second data Ro, Go and Bo with the aid of the first vertical/horizontal synchronizing signals Vsync1 and Hsync1, the first clock signal DCLK1 and the first data enable signal DE1 inputted from the system 40.

Figure 3:
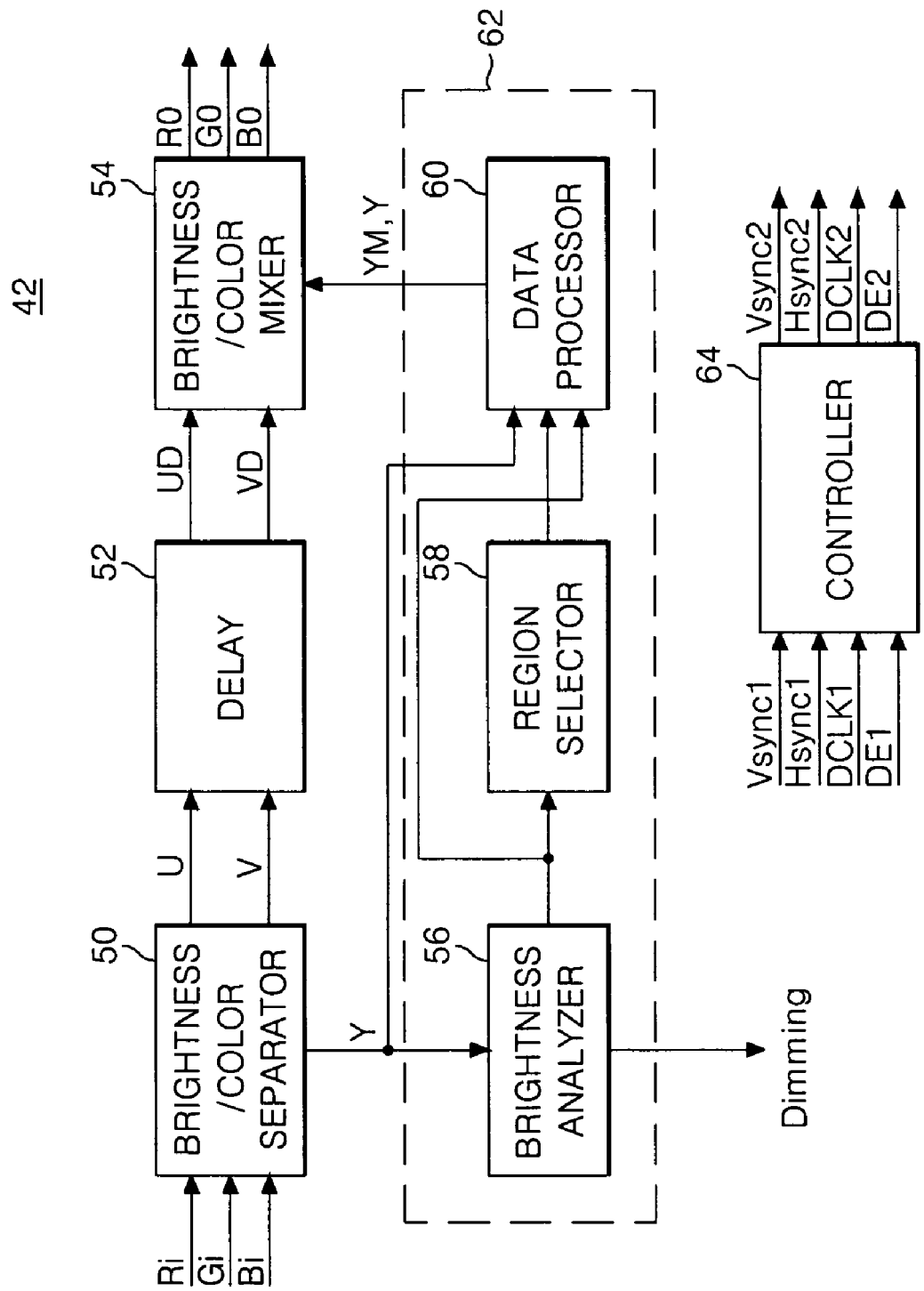
FIG. 3 is a detailed block diagram of the picture quality enhancer shown in FIG. 2.

To this end, as shown in FIG. 3, the picture quality enhancer 42 includes a brightness/color separator 50 for separating the first data Ri, Gi and Bi into brightness components Y and chrominance components U and V, a modulator 62 for modulating the brightness components Y such that the contrast is selectively emphasized to generate modulated brightness components YM, and a brightness/color mixer 54 for generating the second data Ro, Go and Bo using the modulated brightness components YM and the chrominance components U and V.

The brightness/color separator 50 separates the first data Ri, Gi and Bi into brightness components Y and chrominance components U and V. Herein, the brightness components Y and the chrominance components U and V are obtained by the following equations:

$$Y = 0.229 \times Ri + 0.587 \times Gi + 0.114 \times Bi \quad (1)$$

$$U = 0.493 \times (Bi - Y) \quad (2)$$

$$V = 0.887 \times (Ri - Y) \quad (3)$$

The modulator 62 analyzes the brightness components Y, and generates modulated brightness components YM having a selectively emphasized contrast ratio using the analyzed brightness components YM. To this end, the modulator includes a brightness analyzer 56, a region selector 58 and a data processor 60.

The brightness analyzer 56 divides the brightness components Y into gray levels for each frame to generate a histogram, and extracts information from the generated histogram.

Figure 4:
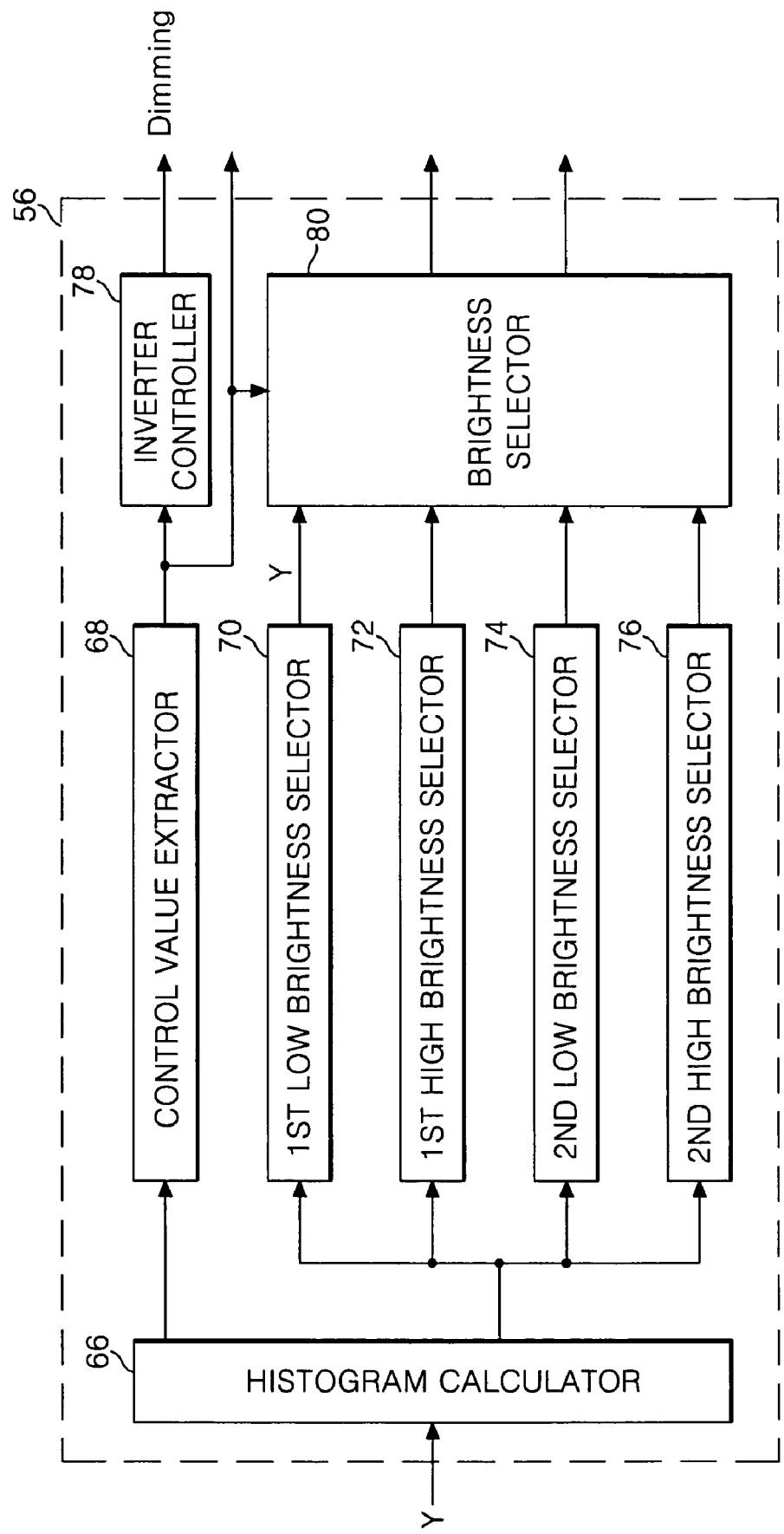
FIG. 4 is a detailed block diagram of the brightness analyzer shown in FIG. 3.

To this end, as shown in FIG. 4, the brightness analyzer 56 includes a histogram calculator 66, a control value extractor 68, a first low brightness selector 70, a first high brightness selector 72, a second low brightness selector 74, a second high brightness selector 76, an inverter controller 78 and a brightness selector 80.

Figure 5:
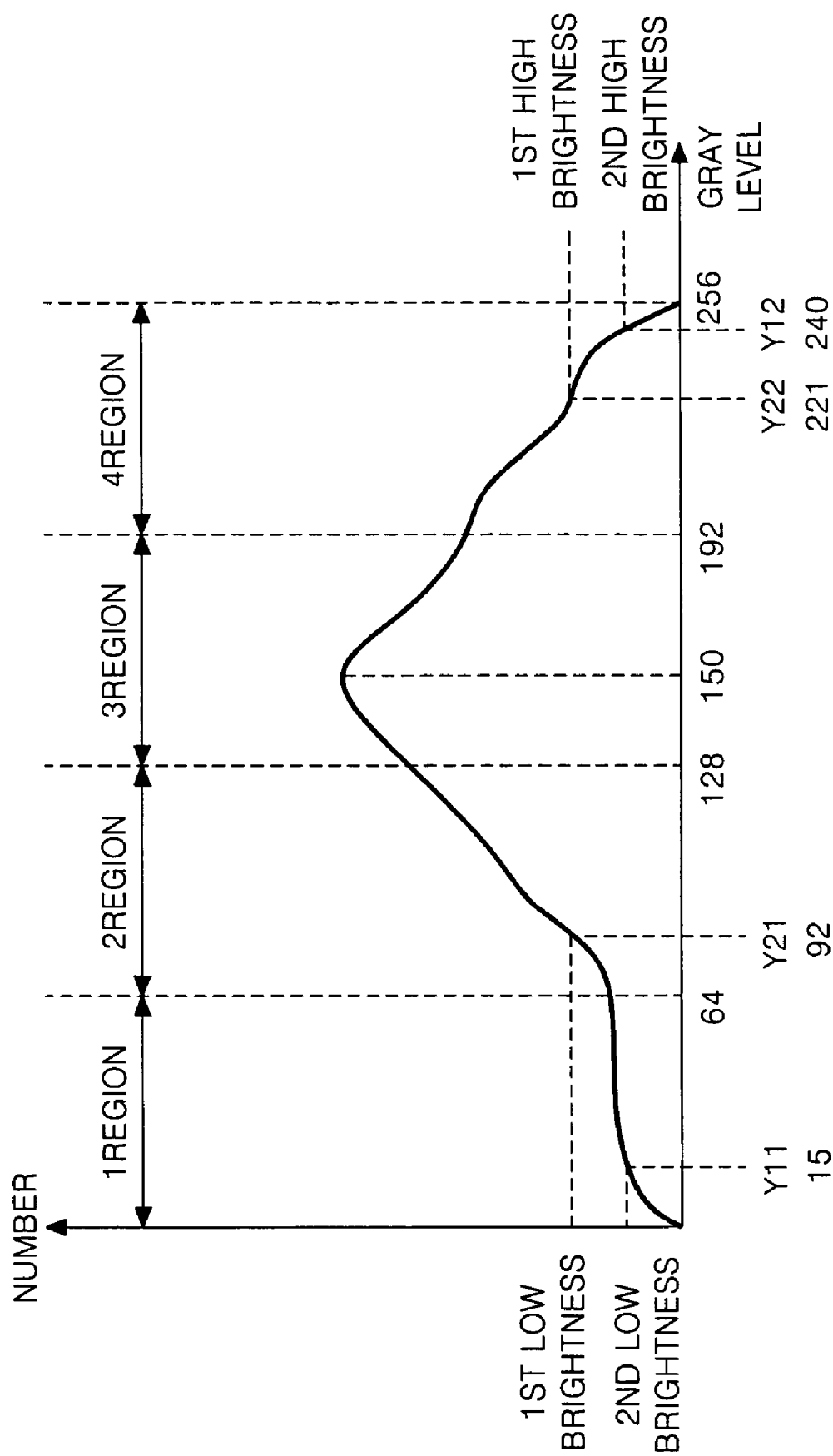
FIG. 5 is a graph showing an example of a histogram calculated by the histogram calculator shown in FIG. 4.

The histogram calculator 66 arranges the brightness components Y for each frame to correspond to the gray levels to thereby obtain a histogram as shown in FIG. 5. The shape of the histogram corresponds to the brightness components Y of the first data Ri, Gi and Bi. Experimentally, most histograms are arranged in a mountain shape having a high rising specific portion (such as a Gaussian shape).

The control value extractor 68 extracts a control value from the histogram. The most-frequent value is extracted as the control value. The most-frequent value is the gray level that has the most numerous brightness value in the histogram. In one example, the control value extractor 68 extracts '150' as the most-frequent value from the histogram shown in FIG. 5 (not quite drawn to scale).

The first low brightness selector 70 extracts a first low brightness Y21 from the histogram. The first low brightness Y21 is set to the gray level in which the number of brightnesses first exceeds 5% to 10% of the number of brightnesses of the most-frequent value in the histogram. In FIG. 5, the first low brightness Y21 has been selected as exceeding 5%, a gray level of '92'.

The first high brightness selector 72 extracts a first high brightness Y22 from the histogram. Similar to the above, the first high brightness Y22 is set to the gray level in which the number of brightnesses last exceeds 5% of the number of brightnesses of the most-frequent value in the histogram. In FIG. 5, the first high brightness Y22 has been selected as exceeding 5%, a gray level of '221'.

The second low brightness selector 74 extracts a second low brightness Y11 from the histogram. The second low brightness Y11 is set to the gray level in which the number of brightnesses first exceeds 1% to 4.9% of the number of brightnesses of the most-frequent value in the histogram. In FIG. 5, the second low brightness Y11 has been selected as exceeding 3%, a gray level of '15'.

The second high brightness selector 76 extracts a second high brightness Y12 from the histogram. The second high brightness Y12 is set to the gray level in which the number of brightnesses last exceeds 1% to 4.9% of the number of brightnesses of the most-frequent value in the histogram. In FIG. 5, the second high brightness Y12 has been selected as exceeding 3%, a gray level of '240'.

Gray levels having the first low brightness Y21, the first high brightness Y22, the second low brightness Y11, and the second high brightness Y12 outputted from the first low brightness selector 70, the first high brightness selector 72, the second low brightness selector 74 and the second high brightness selector 76, respectively, are determined to be specific values in the histogram (as shown, the ordinate of the histogram). The first low brightness Y21, the first high brightness Y22, the second low brightness Y11, and the second high brightness Y12 are brightness values in the histogram (as shown, the abscissa of the histogram).

The inverter controller 78 generates a brightness control signal Dimming in correspondence with the most-frequent value from the control value extractor 68, and applies the generated brightness control signal Dimming to the inverter 36. At this time, the inverter controller 78 generates the brightness control signal Dimming such that light having brightness proportional to the most-frequent value can be applied to the liquid crystal display panel 22.

The brightness selector 80 selectively outputs two gray levels selected from the first low brightness Y21, the first high brightness Y22, the second low brightness Y11, and the second high brightness Y12 outputted from the first low brightness selector 70, the first high brightness selector 72, the second low brightness selector 74 and the second high brightness selector 76, respectively, corresponding to the control value applied thereto. The brightness selector 80 divides the histogram into a plurality of fixed predetermined regions (e.g., 0-63, 64-127, 128-191 and 192-255) as shown in FIG. 5, and determines gray levels outputted corresponding to an area to which the control value belongs in the divided regions (herein referred to as the control area). Selection of the two gray levels will be described in detail during discussion of the region selector 58 below.

Figure 6:
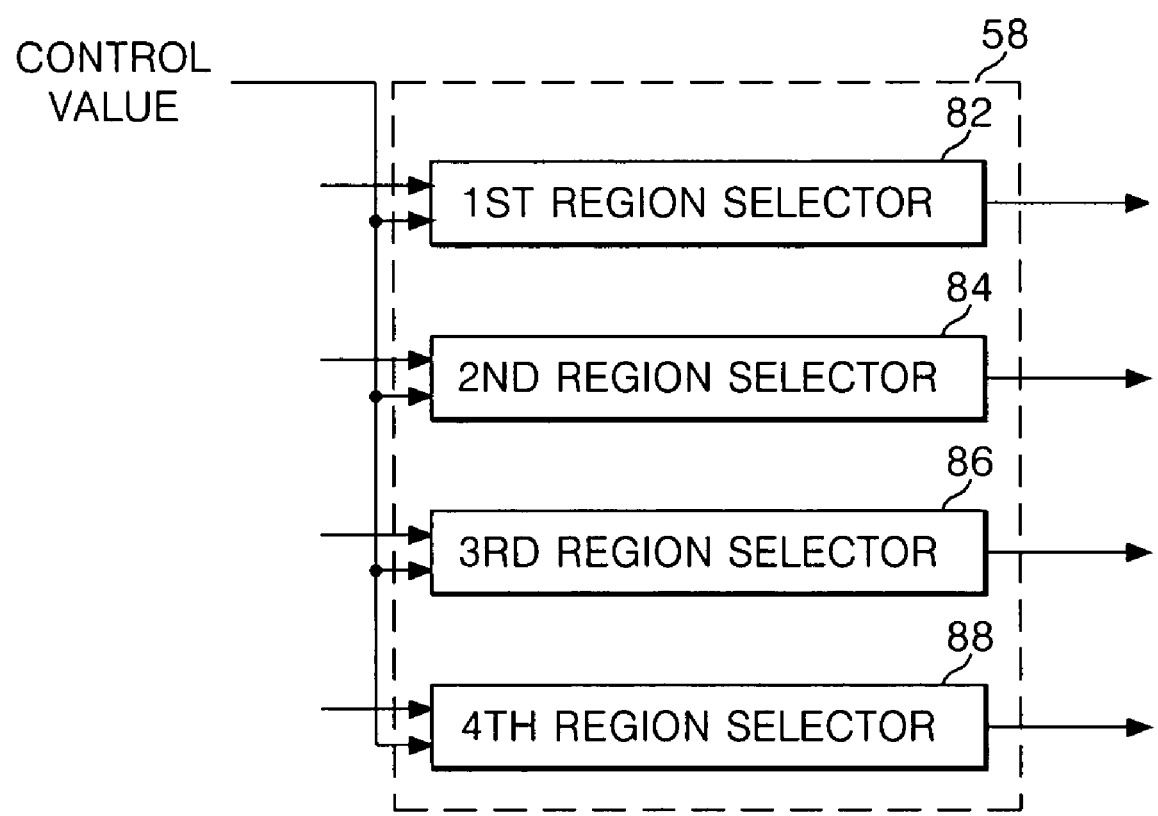
FIG. 6 is a detailed block diagram of the region selector shown in FIG. 3.

The region selector 58 divides the histogram into four regions in response to the two gray levels from the brightness selector 80 and the control value. To this end, as shown in FIG. 6, the region selector 58 contains a first region selector 82, a second region selector 84, a third region selector 86 and a fourth region selector 88.

An operation procedure of the region selector 58 and the brightness selector 80 will be described with reference to FIG. 7 through FIG. 10.

Figure 7:
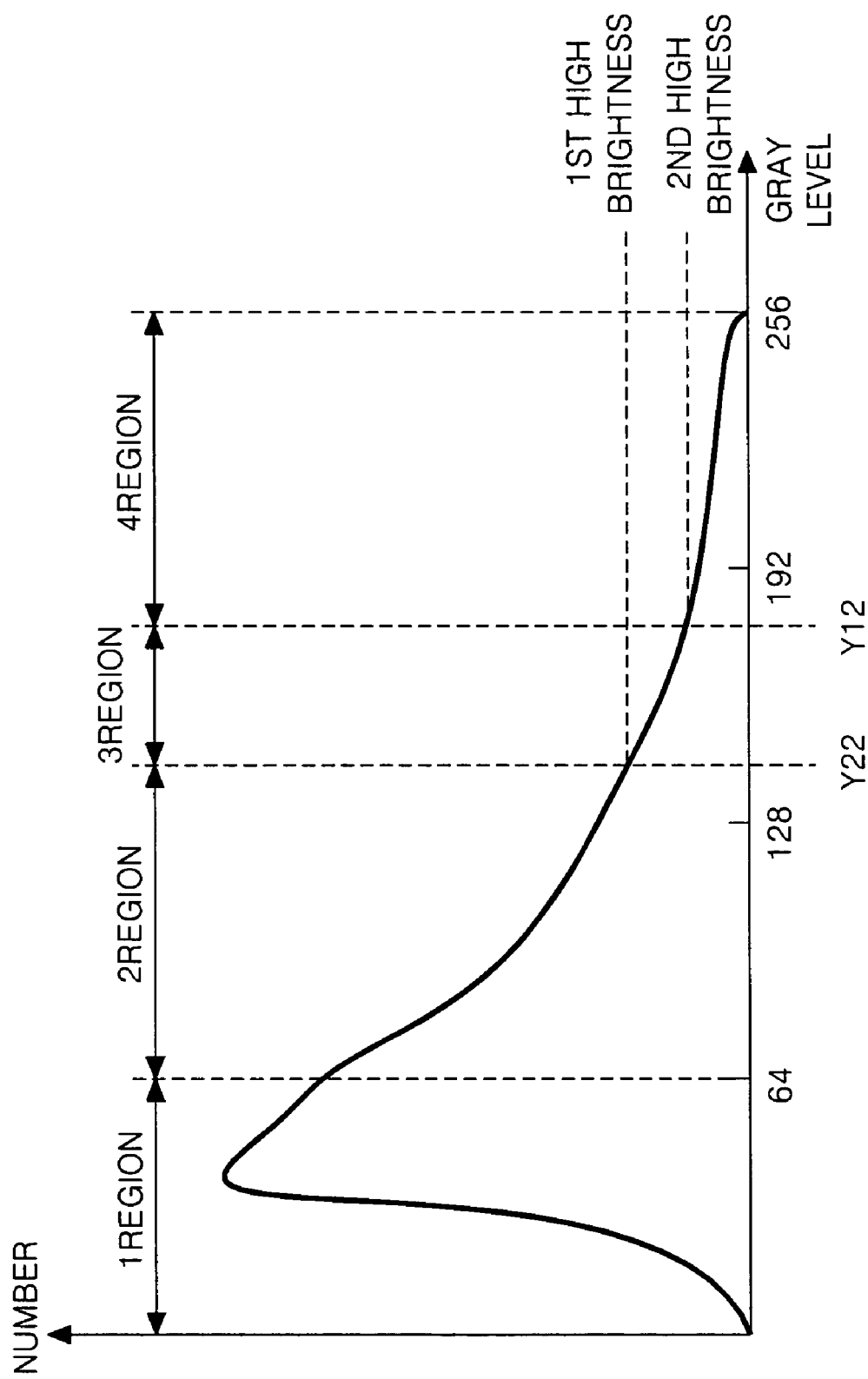
FIG. 7 is a graph showing divided regions of a histogram in which the most-frequent value is in the first region.

Firstly, if the histogram is as shown in. FIG. 7, then the brightness selector 80 checks the control area of the fixed predetermined regions (e.g., 0-63, 64-127, 128-191 and 192-255). In FIG. 7, since the control value (the most-frequent value) belongs to the first region, the brightness selector 80 outputs the first high brightness Y22 and the second high brightness Y12. In other words, the brightness selector 80 selects a brightness value outputted in accordance with the control area.

The first high brightness Y22 and the second high brightness Y12 outputted from the brightness selector 80 are applied to at least one of the second and fourth region selectors 84 and 88. Further, the control value outputted from the brightness selector 80 is applied to the first to fourth selectors 82, 84, 86 and 88.

The first region selector 82 supplied with the control value (belonging to the first region) selects gray levels of '0' to '63' as the first region. The second region selector 84 supplied with the control value and the first high brightness Y22 selects gray levels of '64' to 'Y22−1' as the second region. The third region selector 86 supplied with the control value, the first high brightness Y22 and the second high brightness Y12 selects gray levels of 'Y22' to 'Y12−1' as the third region. The fourth region selector 88 supplied with the control value and the second high brightness Y12 selects gray levels of 'Y12' to '255' as the fourth region. In other words, when the control value belongs to the fixed first region, the region selector 58 divides the histogram into four regions of '0-63', '64-(Y22−1)', 'Y22-(Y12−1)' and 'Y12-255' as shown in FIG. 7.

Accordingly, the present embodiment extracts the control area using the fixed regions and re-divides the histogram into a plurality of regions that may be different dependent on the control area, thereby adaptively dividing the histogram in correspondence with the control area.

The divided region information from the region selector 58 is applied to the data processor 60. Further, the data processor receives the control value from the brightness selector 80. The data processor 60 supplied with the divided region information and the control value generates modulated brightness components YM having a selectively expanded contrast ratio using slope information stored in advance therein. The data processor 60 generates modulated brightness components YM using the curve shown in FIG. 11 when the control value belongs to the first region.

Figure 11:
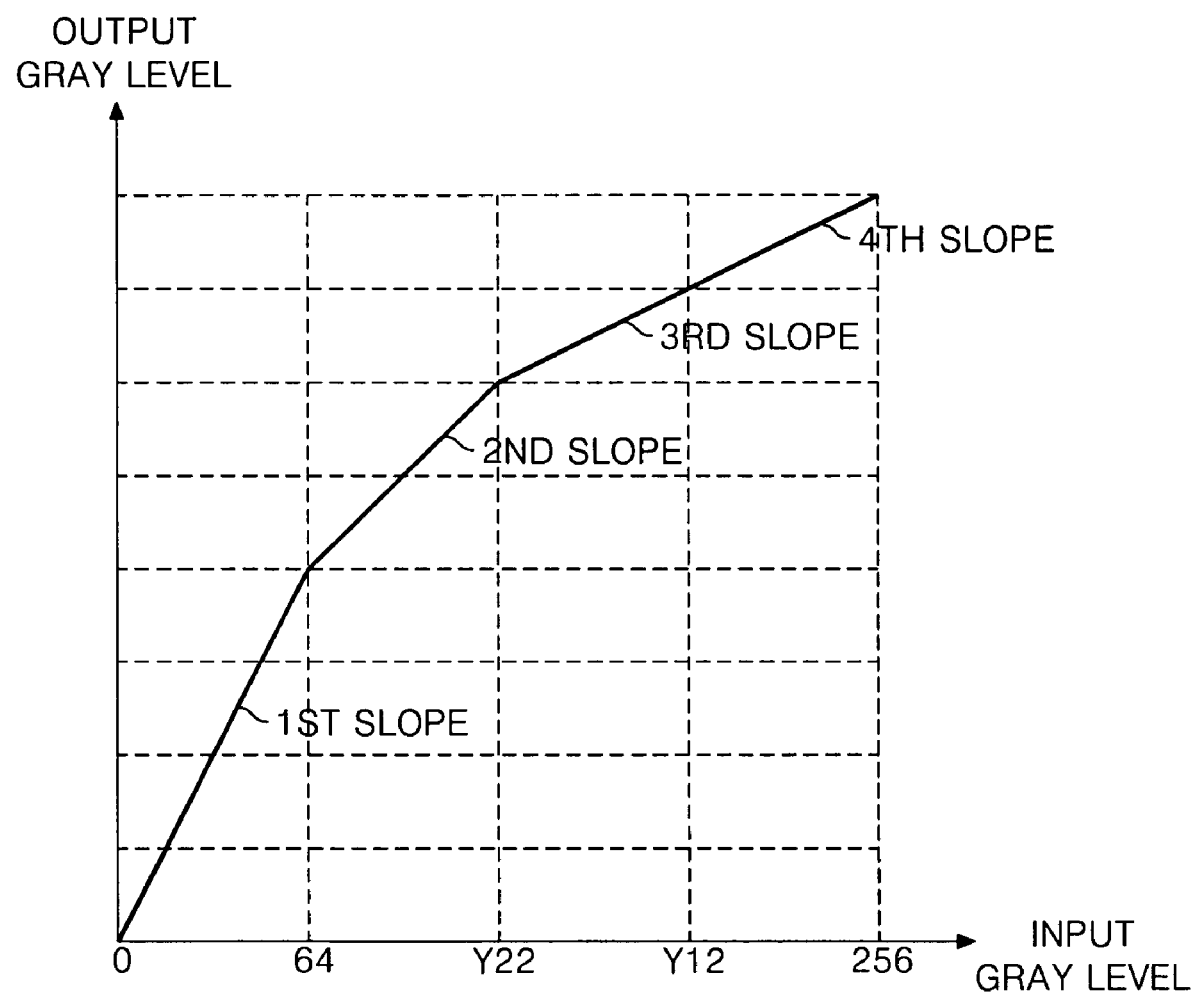
FIG. 11 is a graph showing a slope of a curve in which the modulated brightness components are produced when the most-frequent value is in the first region.

More specifically, the data processor 60, having received the divided region information from the region selector 58, divides the gray levels of the histogram to correspond to the region information. As shown, the data processor 60 divides the histogram into four regions of '0-63', '64-(Y22−1)', 'Y22-(Y12−1)' and 'Y12-255' as shown in FIG. 11. Thereafter, the data processor 60 re-arranges the brightness components Y using a large slope in a region in which the probability of data existing is high while re-arranging the data using a small slope in a region in which the probability of data existing is low. As shown, the data processor 60 re-arranges the gray levels using a large slope in the first region while re-arranging the gray levels using a smaller slope than the first region in the second region. Further, the data processor 60 re-arranges the gray levels using curves having smaller slopes than the second region in the third and fourth regions. Consequently, the data processor 60 re-arranges the brightness components Y using curves having slopes of magnitudes such that first region>second region>third region>fourth region, to thereby generate the modulated brightness components YM.

As described above, the present embodiment re-arranges the brightness components Y using curves having slopes of increasing magnitude in regions of increasing amounts of data, thereby selectively emphasizing a contrast ratio. In other words, when the control value is positioned at the first region, the number of brightness components included in the histogram is experimentally determined as being first region>second region>third region>fourth region. Accordingly, the present embodiment enlarges the range of gray levels using a large sloped curve in a region having a large amount of data (for example, if gray levels in the first region set to '0-63' are re-arranged, then the gray levels are enlarged to '0-80'), thereby selectively emphasizing the contrast ratio and thus displaying a vivid image.

Figure 8A:
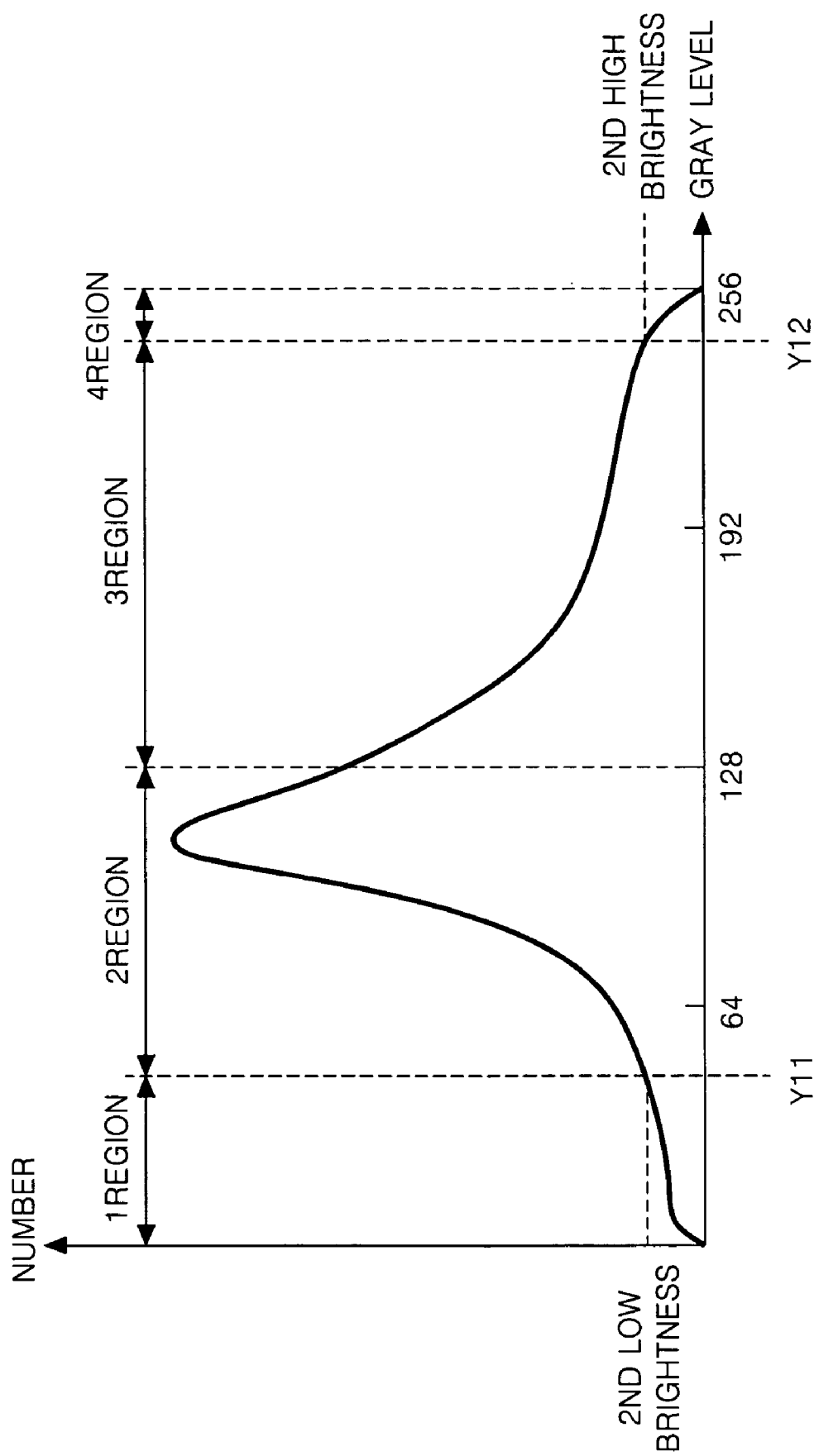

In another example, if the histogram has the shapes as shown in FIG. 8A and FIG. 8B, then the brightness selector 80 checks the control area of fixed predetermined regions. In FIG. 8A and FIG. 8B, since the control value belongs to the second region, the brightness selector 80 outputs a first brightness pair (i.e., the first low brightness Y21 and the first high brightness Y22) or a second brightness pair (i.e., the second low brightness Y11 and the second high brightness Y12).

The first or second brightness pair signal outputted from the brightness selector 80 are applied to the first to fourth region selectors 82 to 88. Herein, each of the first to fourth region selectors 82 to 88 is supplied with a control value outputted from the control value extractor 68.

The first region selector 82 supplied with a control value and the second low brightness Y11 or the first low brightness Y21 selects gray levels of '0' to 'Y11−1' or '0' to 'Y21−1' as the first region. The second region selector 84 supplied with the control value and the second low brightness Y11 or the first low brightness Y21 selects gray levels of 'Y11' to '127' or 'Y21' to '127' as the second region. The third region selector 86 supplied with the control value and the second high brightness Y12 or the first high brightness Y22 selects gray levels of '128' to 'Y12−1' or '128' to 'Y22−1' as the third region. The fourth region selector 88 supplied with the control value and the second high brightness Y12 or the first high brightness Y22 selects gray levels of 'Y12' to '255' or 'Y22' to '255' as the fourth region. In other words, when a control value belongs to the fixed second region, the region selector 58 divides the histogram into four regions of '0-(Y11−1)', 'Y11–127', '128-(Y12–1)' and 'Y12–255' as shown in FIG. 8A, or four regions of '0-(Y21–1)', 'Y21–127', '128-(Y22–1)' and 'Y22–255' as shown in FIG. 8B.

As above, the present embodiment thus extracts the control area using the fixed regions and re-divides the histogram into a plurality of regions corresponding to the control area, thereby adaptively dividing the histogram in correspondence with the control area.

Figure 12A:
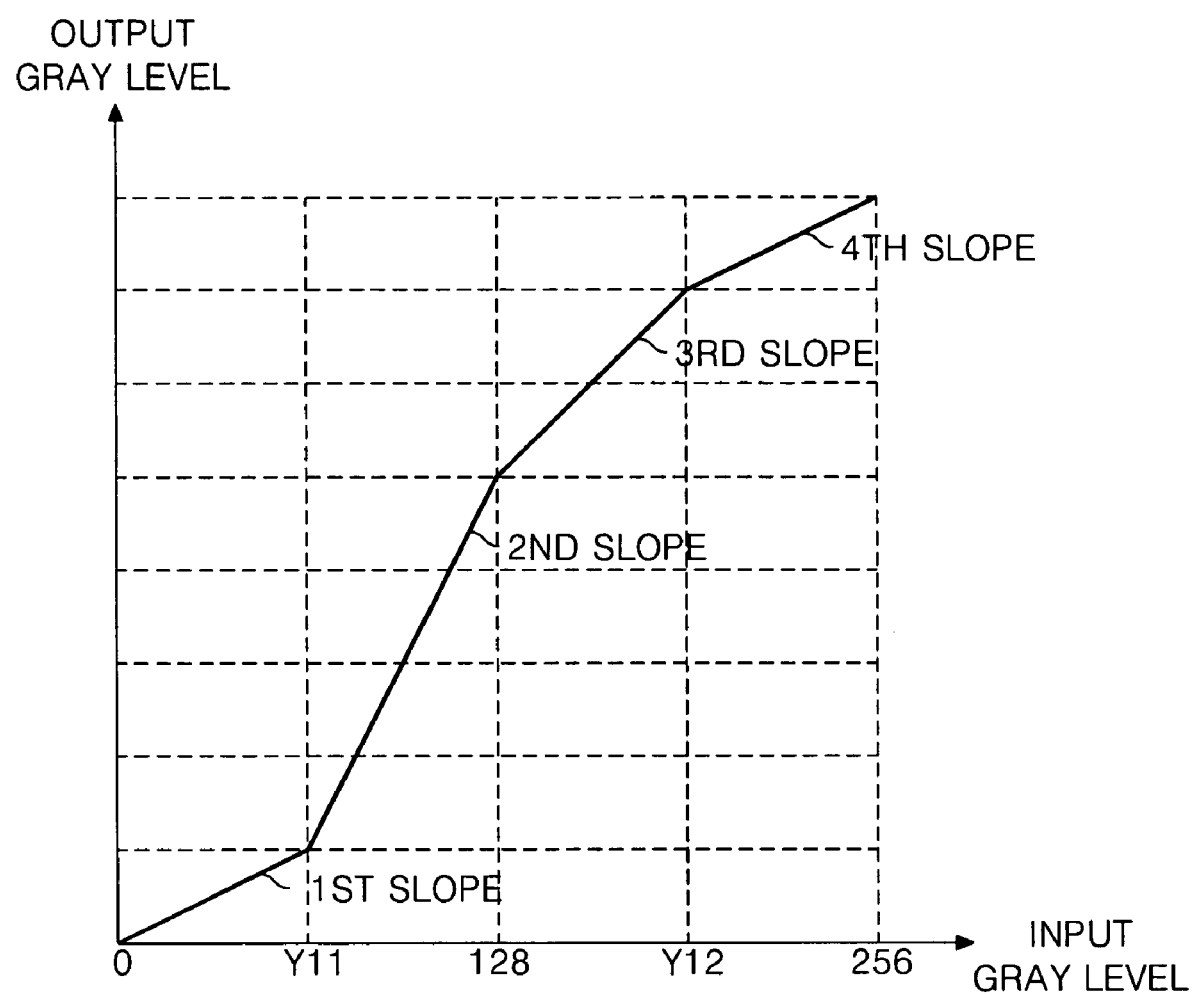
FIG. 12A and FIG. 12B are graphs showing a slope of a curve in which the modulated brightness components are produced when the most-frequent value is in the second region.
Figure 12B:
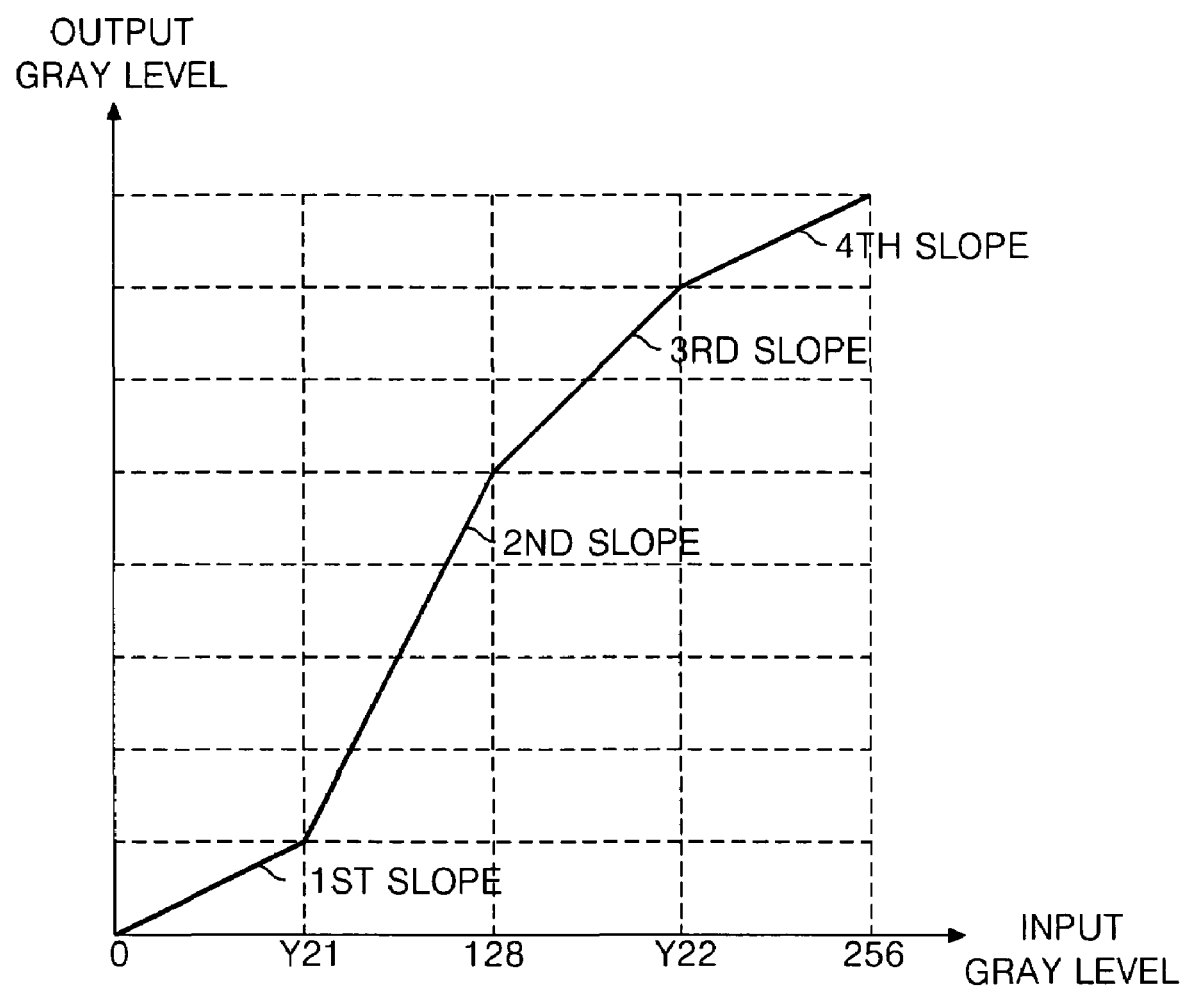

As before, the divided region information from the region selector 58 is applied to the data processor 60. Further, the data processor 60 receives the control value from the brightness selector 80. The data processor 60 supplied with the divided region information and the control value generates modulated brightness components YM having a selectively expanded contrast ratio using slope information stored in advance therein. The data processor 60 generates modulated brightness components YM using curves having slopes as shown in FIG. 12A and FIG. 12B when the control value belongs to the second region.

More specifically, the data processor 60, having received the divided region information from the region selector 58, divides gray levels of the histogram to correspond to region information applied thereto. In other words, the data processor 60 divides the histogram into four regions as shown in FIG. 12A and FIG. 12B. Thereafter, the data processor 60 re-arranges brightness components Y using a large slope in a region having a large number of brightness components Y while re-arranging the data using a small slope in a region having a small number of brightness components Y.

In other words, the data processor 60 re-arranges the gray levels using a curve with a large slope in the second region to which the control value belongs while re-arranging the gray levels using a curve having a smaller slope than the second region in the third region. Further, the data processor 60 re-arranges gray levels using curves having smaller slopes than the third region in the first and fourth regions. Consequently, the data processor 60 re-arranges the brightness components Y using curves having slopes with magnitudes in which second region>third region>first region>fourth region, to thereby generate the modulated brightness components YM.

As described above, the present embodiment re-arranges brightness components Y using curves having increased slope in regions with increasing amounts of data as shown in FIG. 8A and FIG. 8B, thereby selectively emphasizing the contrast ratio and permitting display of a vivid image on the liquid crystal display panel 22.

Figure 9B:
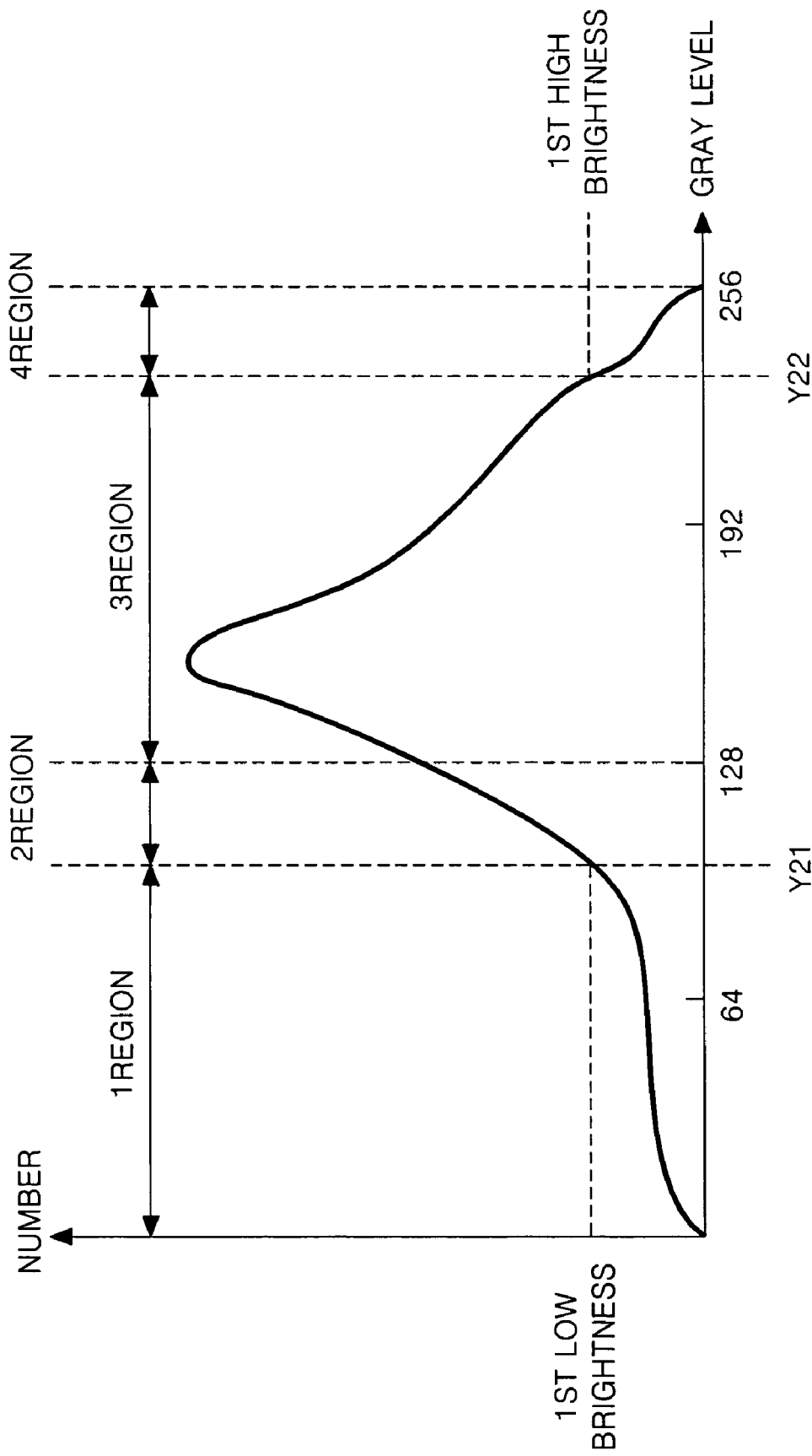

In yet another example; if the histogram has the shapes shown in FIG. 9A and FIG. 9B, then the brightness selector 80 checks the control area of predetermined fixed regions. In FIG. 9A and FIG. 9B, since the control value belongs to the third region, the brightness selector 80 outputs the first brightness pair or the second brightness pair.

The first or second brightness pair signal outputted from the brightness selector 80 are applied to the first to fourth region selectors 82 to 88. Each of the first to fourth region selectors 82 to 88 is supplied with a control value outputted from the control value extractor 68.

Similar to the previous example shown in FIGS. 8A and 8B, the first region selector 82 supplied with the control value and the second low brightness Y11 or the first low brightness Y21 selects gray levels of '0' to 'Y11–1' or '0' to 'Y21–1' as the first region. The second region selector 84 supplied with the control value and the second low brightness Y11 or the first low brightness Y21 selects gray levels of 'Y11' to '127' or 'Y21' to '127' as the second region. The third region selector 86 supplied with the control value and the second high brightness Y12 or, the first high brightness Y22 selects gray levels of '128' to 'Y12–1' or '128' to 'Y22–1' as the third region. The fourth region selector 88 supplied with the control value and the second high brightness Y12 or the first high brightness Y22 selects gray levels of 'Y12' to '255' or 'Y22' to '255' as the fourth region. Thus, when the control value belongs to the fixed third region, the region selector 58 divides the histogram into four regions of '0-Y11–1', 'Y11–127', '128-Y12–1' and 'Y12–255' as shown in FIG. 9A, or four regions of '0-Y21–1', 'Y21–127', '128-Y22–1' and 'Y22–255' as shown in FIG. 9B.

Accordingly, the present embodiment extracts the control area using the fixed region and re-divides the histogram into a plurality of regions in correspondence with the control area, thereby adaptively dividing the histogram in correspondence with the control area.

Figure 13A:
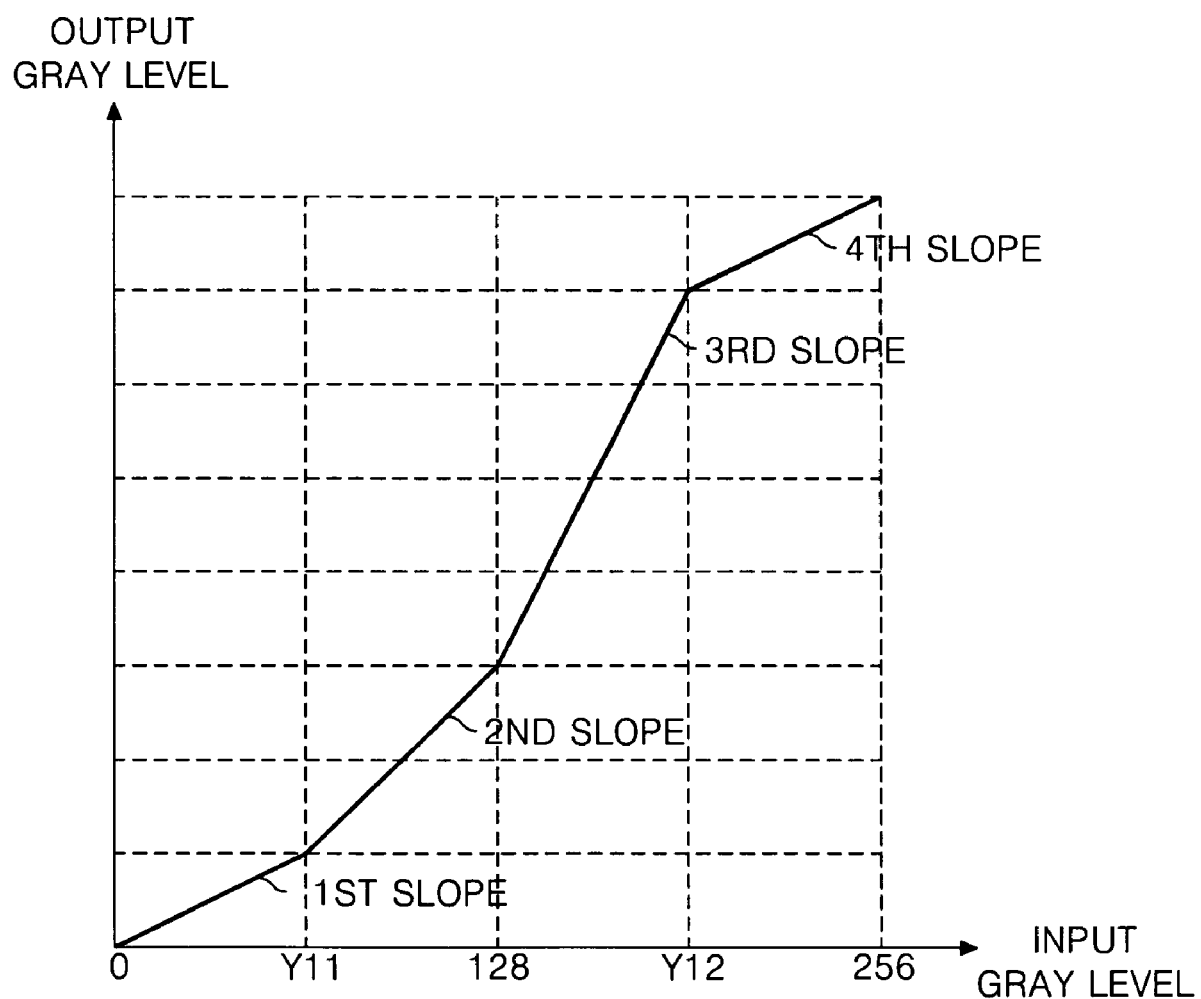
FIG. 13A and FIG. 13B are graphs showing a slope of a curve in which the modulated brightness components are produced when the most-frequent value is in the third region.
Figure 13B:
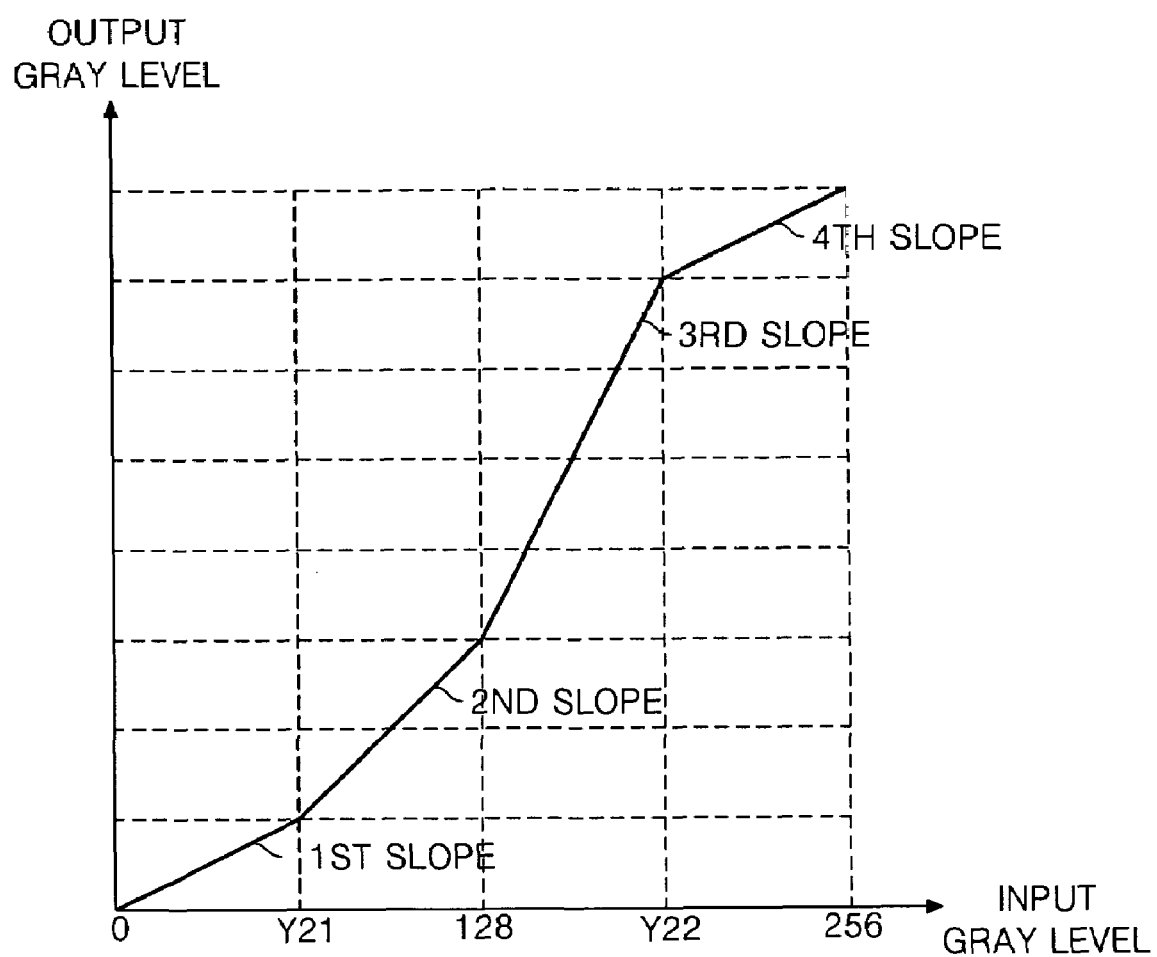

The divided region information from the region selector 58 is applied to the data processor 60. Further, the data processor 60 receives the control value from the brightness selector 80. The data processor 60 supplied with the divided region information and the control value generates modulated brightness components YM having a selectively expanded contrast ratio using slope information stored in advance therein. The data processor 60 generates modulated brightness components YM using curves having slopes as shown in FIG. 13A and FIG. 13B when the control value belongs to the third region.

More specifically, the data processor 60 having received the divided region information from the region selector 58 divides the gray levels of the histogram to correspond to region information applied thereto. In other words, the data processor 60 divides the histogram into four regions as shown in FIG. 13A and FIG. 13B. Thereafter, the data processor 60 re-arranges the brightness components Y using a large slope in a region having a large amount of data while re-arranging the data using a small slope of curve in a region having a small amount of data.

In other words, the data processor 60 re-arranges the gray levels using a large slope in the third region to which the control value belongs while re-arranging the gray levels using a curve having a lower slope than the third region in the second region. Further, the data processor 60 re-arranges gray levels using curves having lower slopes than the second region in the first and fourth regions. Consequently, the data processor 60 re-arranges brightness components Y using curves having slopes in which the magnitude is third region>second region>first region>fourth region, to thereby generate modulated brightness components YM.

As described above, the present embodiment re-arranges brightness components Y using a curve of increasing slope in regions of increasing amounts of data, as shown in FIG. 9A and FIG. 9B, thereby selectively emphasizing the contrast ratio and permitting display of a vivid image on the liquid crystal display panel 22.

In another example, if the histogram has the shape shown in FIG. 10, then the brightness selector 80 checks the control area. In FIG. 10, since the control value belongs to the fourth region, the brightness selector 80 outputs the first low brightness Y21 and the second low brightness Y11.

The first low brightness Y21 and the second low brightness Y11 outputted from the brightness selector 80 are applied to the first to third region selectors 82 to 86. Each of the first to fourth region selectors 82 to 88 is supplied, with the control value outputted from the control value extractor 68.

The first region selector 82 supplied with the control value and the second low brightness Y11 selects gray levels of '0' to 'Y11–1' as the first region. The second region selector 84 supplied with the control value, the second low brightness Y11 and the first low brightness Y21 selects gray levels of 'Y11' to 'Y21−1' as the second region. The third region selector 86 supplied with the control value and the first low brightness Y21 selects gray levels of 'Y21' to '191' as the third region. The fourth region selector 88 supplied with the control value selects gray levels of '192' to '255' as the fourth region. In other words, when the control value belongs to the fixed fourth region, the region selector 58 divides the histogram into four regions of '0-(Y11−1)', 'Y11-(Y21−1)', 'Y21−191' and '192-255' as shown in FIG. 10.

Accordingly, the present embodiment extracts the control using the fixed region and re-divides the histogram into a plurality of regions corresponding to the control area, thereby adaptively dividing the histogram in correspondence with the control area.

Figure 14:
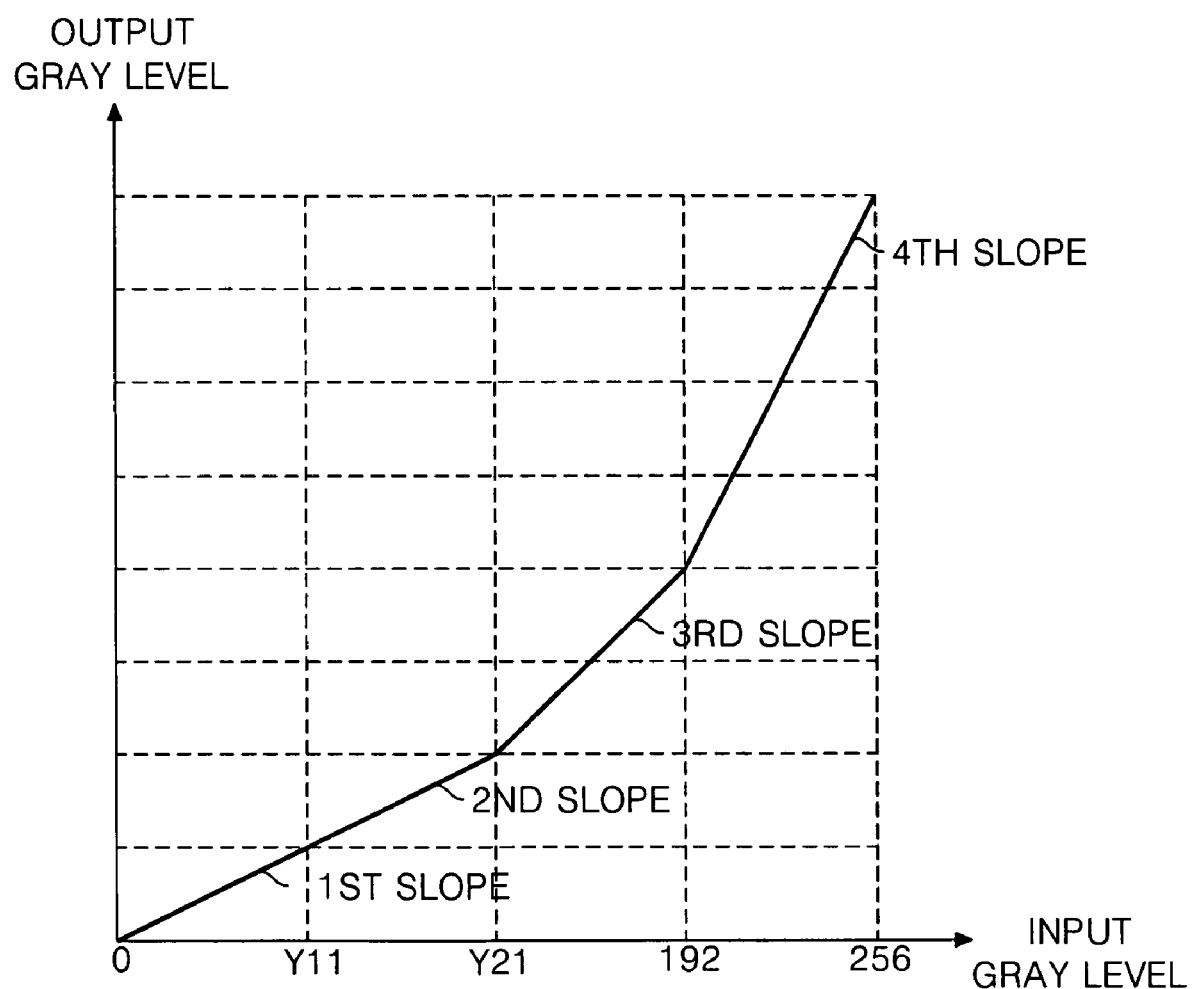
FIG. 14 is a graph showing a slope of a curve in which the modulated brightness components are produced when the most-frequent value is in the fourth region.

The divided region information from the region selector 58 is applied to the data processor 60. Further, the data processor receives the control value from the brightness selector 80. The data processor 60 supplied with the divided region information and the control value generates modulated brightness components YM having a selectively expanded contrast ratio using slope information stored in advance therein. The data processor 60 generates modulated brightness components YM using a slope curve as shown in FIG. 14 when the control value belongs to the fourth region.

More specifically, the data processor 60, having received the divided region information from the region selector 58, divides gray levels of the histogram to correspond to region information applied thereto. The data processor 60 divides the histogram into four regions as shown in FIG. 14. Thereafter, the data processor 60 re-arranges the brightness components Y using a large slope in a region having a large amount of data while re-arranging the data using a small slope in a region having a small amount of data.

In other words, the data processor 60 re-arranges gray levels using a large slope in the fourth region to which the control value belongs while re-arranging gray levels using a curve having a smaller slope than the fourth region in the third region. Further, the data processor 60 re-arranges gray levels using curves having smaller slopes than the third region in the first and second regions. Consequently, the data processor 60 re-arranges brightness components Y using curves having slopes of magnitude fourth region>third region>first region>second region, to thereby generate the modulated brightness components YM.

As described above, the present embodiment re-arranges brightness components Y using curves having increasing slope in regions with increasing amounts of data as shown in FIG. 10, thereby selectively emphasizing the contrast ratio and permitting display of a vivid image on the liquid crystal display panel 22.

The present embodiment outputs unmodulated data when a picture of a single color, such as full black or full white, etc. is displayed. If such data is modulated to enlarge the contrast ratio, accurate display of a black or white picture may not occur on the liquid crystal display panel 22 (for instance, a gray color may not be displayed). Such a picture is checked by the brightness selector 80.

Figure 15A:
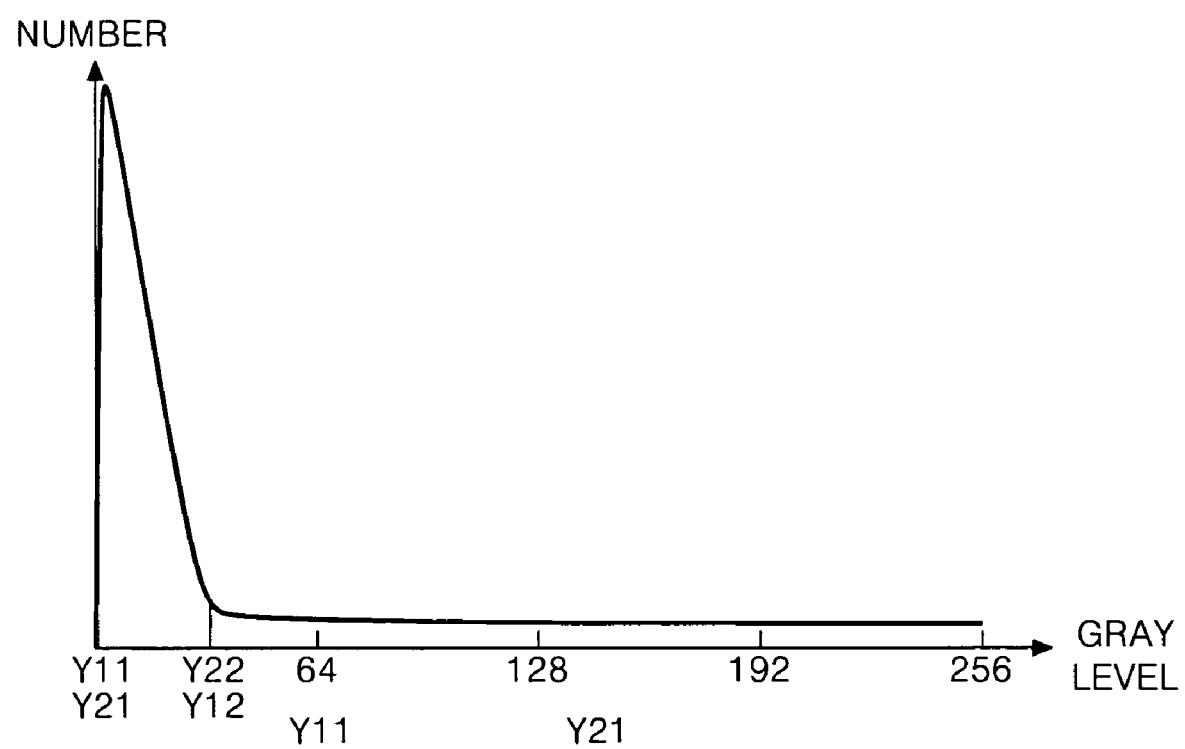
FIG. 15A and FIG. 15B are graphs showing histograms having brightness components corresponding to a full white and a full black picture, respectively.
Figure 15B:
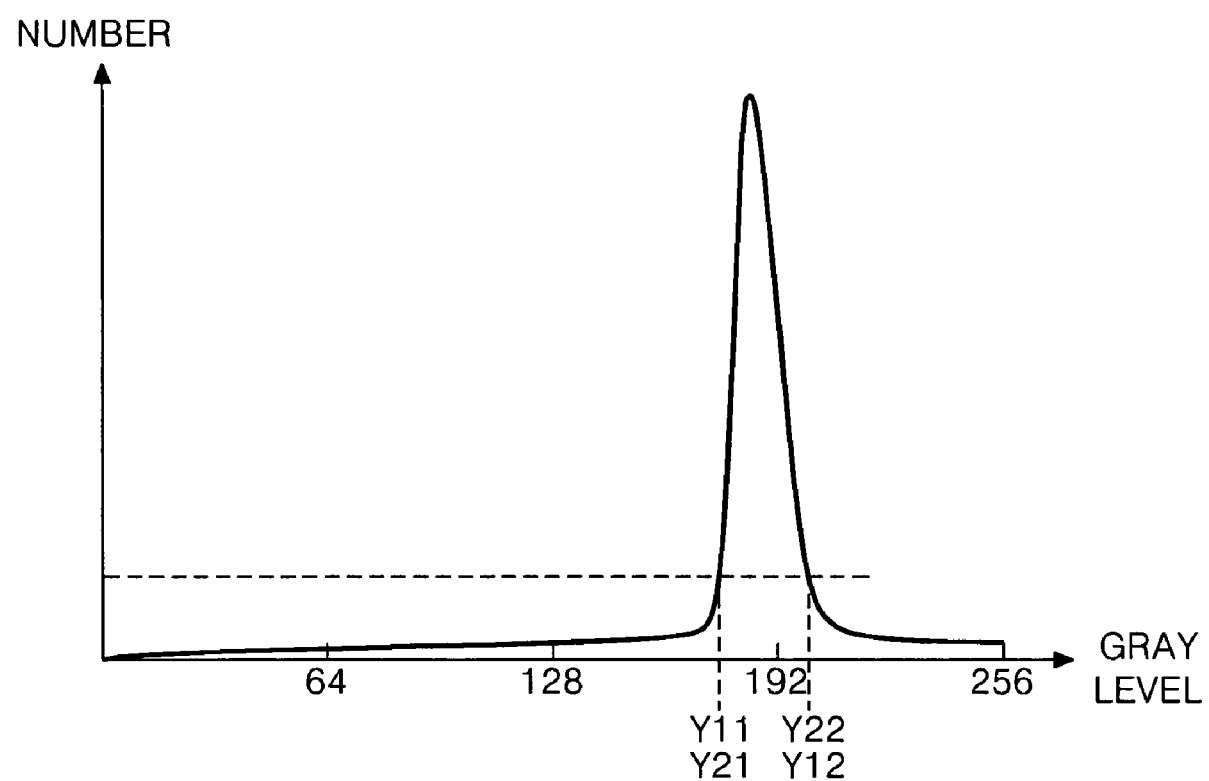

More specifically, when a full black or full white picture is displayed, a histogram calculated by the histogram calculator 66 is shown in FIG. 15A and FIG. 15B. In other words, when a full black or full white picture is displayed, a major part of brightness components emerge biased toward the left side (black) or the right (white) side of the histogram and result in a narrow distribution. Thus, the first brightness pair or the second brightness pair are adjacent to each other, i.e. in the same region.

In other words, the first brightness pair (or the second brightness pair) are adjacent to each other and have the desired gray level therebetween. The brightness selector 80 determines the currently displayed picture to be a full black or full white picture when the first brightness pair (or the second brightness pair) is adjacent to each other and have the desired gray level therebetween, to thereby apply a control signal to the data processor 60. The data processor 60 having received the control signal from the brightness selector 80 applies the brightness components Y supplied thereto to the brightness/color mixer 54 without any modulation.

The delay 52 delays chrominance components U and V until the modulated brightness components YM or the brightness components Y is outputted from the data processor 58. Then, the delay 52 applies the delayed chrominance components UD and VD synchronized with the modulated brightness components YM or the brightness components Y to the brightness/color mixer 54.

The brightness/color mixer 54 generates second data Ro, Go and Bo with the aid of the modulated brightness components YM (or brightness components Y) and the delayed chrominance components UD and VD. Herein, the second data Ro, Go and Bo is obtained by the following equations:

$$Ro = YM + 0.000 \times UD + 1.140 \times VD \tag{4}$$

$$Go = YM - 0.396 \times UD - 0.581 \times VD \tag{5}$$

$$BO = YM + 2.029 \times UD + 0.000 \times VD \tag{6}$$

The second data Ro, Go and Bo produced from the modulated brightness components YM have a more selectively emphasized contrast ratio than the first data Ri, Gi and Bi, and thus a vivid image is displayed. On the other hand, the second data Ro, Go and Bo produced from the brightness components Y has the same contrast ratio as the first data Ri, Gi and Bi.

The controller 64 receives the first vertical/horizontal synchronizing signals Vsync1 and Hsync1, the first clock signal DCLK1 and the first data enable signal DE1 from the system 40. Further, the controller 64 generates the second vertical/horizontal synchronizing signals Vsync2 and Hsync2, the second clock signal DCLK2 and the second data enable signal DE2 in such a manner to be synchronized with the second data Ro, Go and Bo, and applies them to the timing controller 30.

In summary, an area to which the most-frequent value belongs is extracted from the histogram (the control area), and the histogram is divided into a plurality of regions in correspondence with the extracted most-frequent value. Furthermore, the brightness components are re-arranged with the aid of a curve having a specific slope in the divided regions, so that the contrast can be selectively expanded to thereby display a vivid image. More specifically, the brightness components are re-arranged with using slopes of increasing magnitude in regions of increasing numbers of brightness components. Moreover, the brightness of the back light is controlled dependent upon the control value, thereby permitting display of a vivid image having an expanded contrast.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of driving a liquid crystal display, comprising:
   (A) converting first data into brightness components and chrominance components;
   (B) modulating the brightness components such that a contrast ratio thereof is selectively emphasized to thereby generate modulated brightness components, the modulating including: arranging the brightness components into gray levels for each frame to generate a histogram, extracting a control value from the histogram, dividing the histogram into a plurality of fixed regions including a control region to which the control value belongs, re-setting the ranges of the regions of the histogram corresponding to the control region wherein the re-set ranges of the regions are different from the ranges of the fixed regions, and generating the modulated brightness components using a curve having slopes that are different in the re-set histogram regions; and
   (C) generating second data having a selectively emphasized contrast ratio using the modulated brightness components and the chrominance components;
   wherein the control value is selected to be a gray level value existing most frequently in the histogram,
   wherein the modulated brightness components are generated by using a curve having a largest slope in the control region.

2. The method of claim 1, further comprising converting a synchronizing signal in synchronization with the first data to be synchronized with the second data.

3. The method of claim 1, further comprising controlling brightness of a back light to be in proportion to a gray level of the control value.

4. The method of claim 1, further comprising delaying the chrominance components until the modulated brightness components are generated.

5. The method of claim 1, further comprising dividing the histogram into four regions of the same range: a first region, a second region, a third region and a fourth region and determining the control region as one of the divided four regions.

6. The method of claim 5, further comprising re-setting the regions of the histogram using two extracted brightnesses, and extracting the extracted brightnesses in response to the control value comprises two of:
   extracting a first low brightness as a first gray level of the histogram having a brightness that exceeds a first reference value;
   extracting a first high brightness as a last gray level of the histogram having a frequency that exceeds the first reference;
   extracting a second low brightness as a first gray level of the histogram having a frequency that exceeds a second reference; and
   extracting a second high brightness as a last gray level of the histogram having a frequency that exceeds the second reference.

7. The method of claim 6, wherein the first reference is a frequency that is 5% to 10% of a maximum frequency in the histogram.

8. The method of claim 7, wherein the second reference is a frequency that is 1% to 4.9% of the maximum frequency in the histogram.

9. The method of claim 8, wherein the gray levels increase from the first region to the fourth region.

10. The method of claim 8, further comprising determining that the control value is in the first region, extracting the first and second high brightness, and re-arranging the regions of the histogram using the extracted first and second high brightness.

11. The method of claim 10, further comprising generating the modulated brightness components using a curve having slopes proportional to amounts of data in the regions after re-arranging the regions of the histogram.

12. The method of claim 8, further comprising determining that the control value is in the second region or the third region, extracting the second low brightness and the second high brightness or the first low brightness and the first high brightness and re-arranging the regions of the histogram using the extracted second low brightness and the extracted second high brightness or the extracted first low brightness and the extracted first high brightness.

13. The method of claim 12, further comprising generating the modulated brightness components using a curve having slopes proportional to amounts of data in the regions after re-arranging the regions of the histogram.

14. The method of claim 8, further comprising determining that the control value is in the fourth region, extracting the first and second low brightness and re-arranging the regions of the histogram using the extracted first and second low brightness.

15. The method of claim 14, further comprising generating the modulated brightness components using a curve having slopes proportional to amounts of data in the regions after re-arranging the regions of the histogram.

16. The method of claim 8, further comprising:
   determining positions of the first low brightness and the first high brightness; and
   generating the second data from non-modulated brightness components and chrominance components when the first low brightness and the first high brightness are in the same region and have a desired gray level therebetween.

17. The method of claim 8, further comprising:
   determining positions of the second low brightness and the second high brightness; and
   generating the second data from non-modulated brightness components and chrominance components when the second low brightness and the second high brightness are in the same region and have a desired gray level therebetween.

18. A driving apparatus for a liquid crystal display, comprising:
   a brightness/color separator for converting first data into brightness components and chrominance components;
   a modulator for modulating the brightness components such that a contrast ratio is selectively emphasized to thereby generate modulated brightness components, the modulator containing: a brightness analyzer for arranging the brightness components into gray levels for each frame to generate a histogram and for dividing the histogram into a plurality of fixed regions including a control region and for determining the control region to which a control value belongs and for extracting a control value from the control region of the histogram, a moving region selector for dividing the histogram into a plurality of moving regions in response to the control value wherein the ranges of the moving regions are different from the ranges of the fixed regions, and a data controller for generating the modulated brightness components using a curve having different slopes in the different moving regions; and a brightness/color mixer for generating second data having a selectively emphasized contrast ratio using the modulated brightness components and the chrominance components;

wherein the control value is selected to be a gray level value existing most frequently in the histogram, wherein the modulated brightness components are generated by using a curve having a largest slope in the control region.

19. The driving apparatus of claim 18, further comprising a controller for converting a synchronizing signal in synchronization with the first data to be synchronized with the second data.

20. The driving apparatus of claim 18, further comprising an inverter controller for controlling brightness of a back light in correspondence with a gray level value of the control value.

21. The driving apparatus of claim 18, further comprising delay means for delaying the chrominance components until the modulated brightness components are generated.

22. The driving apparatus of claim 18, wherein the brightness analyzer comprises:
   a histogram calculator for arranging the brightness components into gray levels for each frame to generate a histogram;
   a control value extractor for extracting the control value from the histogram; and
   a brightness selector for dividing the histogram into a plurality of the fixed regions and determining the control region to which the control value belongs.

23. The driving apparatus of claim 22, wherein the brightness selector divides the histogram into a first region, a second region, a third region and a fourth region such that each histogram can be divided into the same fixed region, and determines the control region from the divided four regions.

24. The driving apparatus of claim 23, wherein the brightness selector applies a control signal to the data processor when the first low brightness and the first high brightness are in the same region and have a desired gray level therebetween, and the data processor generates the second data from non-modulated brightness components and chrominance components.

25. The driving apparatus of claim 23, wherein the brightness selector applies a control signal to the data processor when the second low brightness and the second high brightness are in the same region and have a desired gray level therebetween, and the data processor generates the second data from non-modulated brightness components and chrominance components.

26. The driving apparatus of claim 23, wherein the brightness analyzer includes:
   a first low brightness extractor for extracting a first low brightness as a first gray level of the histogram having a frequency that exceeds a first reference;
   a first high brightness extractor for extracting a first high brightness as a last gray level of the histogram having a frequency that exceeds the first reference;
   a second low brightness extractor for extracting a second low brightness as a first gray level of the histogram having a frequency that exceeds a second reference; and
   a second high brightness extractor for extracting a second high brightness as a last gray level of the histogram having a frequency that exceeds the second reference,
   wherein the brightness selector applies at least two brightnesses, of the first low brightness, the first high brightness, the second low brightness and the second high brightness, in correspondence with an area to which the control value belongs to the moving region selector.

27. The driving apparatus of claim 26, wherein the gray levels increase from the first region to the fourth region.

28. The driving apparatus of claim 26, wherein the first reference is a frequency that is 5% to 10% of a maximum frequency in the histogram.

29. The driving apparatus of claim 28, wherein the second reference is a frequency that is 1% to 4.9% of the maximum frequency in the histogram.

30. The driving apparatus of claim 29, wherein, when the control value is in the first region, the brightness selector extracts the first and second high brightness, and the moving region selector sets moving regions of the histogram using the extracted first and second high brightness.

31. The driving apparatus of claim 30, wherein, after the regions of the histogram are re-arranged, the data processor generates the modulated brightness components using a curve having slopes proportional to amounts of data in the regions.

32. The driving apparatus of claim 29, wherein, when the control value is in the second region or the third region, the brightness selector extracts the second low brightness and the second high brightness or the first low brightness and the first high brightness, and the moving region selector sets moving regions of the histogram using the extracted second low brightness and the extracted second high brightness or the extracted first low brightness and the extracted first high brightness.

33. The driving apparatus of claim 32, wherein, after the regions of the histogram are re-arranged, the data processor generates the modulated brightness components using curves having slopes proportional to amounts of data in the regions.

34. The driving apparatus of claim 29, wherein, when the control value is in the fourth region, the brightness selector extracts the first and second low brightness, and the moving region selector re-arranges the regions of the histogram using the extracted first and second low brightness.

35. The driving apparatus of claim 34, wherein, after the regions of the histogram are re-arranged, the data processor generates the modulated brightness components using curves having slopes proportional to amounts of data in the regions.

36. A method of driving a frame of a liquid crystal display, comprising:
   arranging brightness components into gray levels to generate a histogram having first regions;
   extracting a control value from a control region of the histogram;
   adjusting, dependent upon the control value, ranges of the first regions of the histogram to form second regions, wherein the ranges of the second regions are different from the ranges of the first regions;
   generating modulated brightness components using a curve having slopes that depend on the brightness values in the second regions;
   wherein the control value is selected to be a gray level value existing most frequently in the histogram,
   wherein the modulated brightness components are generated by using a curve having a largest slope in the control region.

37. The method of claim 36, further comprising setting the first regions to be the same from frame to frame.

38. The method of claim 36, further comprising setting each of the first regions to have the same range.

39. The method of claim 36, further comprising generating the modulated brightness components using a curve having slopes dependent on amounts of data in the second regions.

40. The method of claim 36, further comprising adjusting the ranges of the first regions dependent on a frequency of a particular gray level and the first region in which the particular gray level is disposed.

41. The method of claim 40, further comprising selecting the particular gray level to be a gray level having a maximum frequency in the histogram.

42. The method of claim 41, further comprising setting the control value to be the particular gray level.

43. The method of claim 40, further comprising adjusting the ranges of the first regions using a first gray level that has a first percentage of the frequency of the particular gray level and a second gray level that has a second percentage of the frequency of the particular gray level.

44. The method of claim 43, further comprising setting the first and second percentages to be equal.

45. The method of claim 44, further comprising setting the first and second gray levels to be minimum and maximum gray levels that have the first and second percentages.

46. The method of claim 43, further comprising setting the first and second percentages to be different.

47. The method of claim 46, further comprising setting the first and second gray levels to be minimum or maximum gray levels that have the first and second percentages.

48. The method of claim 43, further comprising preventing the modulated brightness components from being different than the brightness components when the first and second gray levels are in the same region.

* * * * *